US012451122B1

United States Patent
Werchniak et al.

(10) Patent No.: US 12,451,122 B1
(45) Date of Patent: Oct. 21, 2025

(54) FEDERATED LEARNING FOR AUDIO PROCESSING

(71) Applicant: Amazon Technologies, Inc., Seattle, WA (US)

(72) Inventors: Andrew Morris Werchniak, Boston, MA (US); Ilya Sokolov, Boston, MA (US); Raphael Petegrosso, Cambridge, MA (US); Aansh Shah, Cambridge, MA (US); Aaron Challenner, Melrose, MA (US); Michael Thomas Peterson, Watertown, MA (US); Shuang Wu, Shelburne, VT (US)

(73) Assignee: Amazon Technologies, Inc., Seattle, WA (US)

( * ) Notice: Subject to any disclaimer, the term of this patent is extended or adjusted under 35 U.S.C. 154(b) by 340 days.

(21) Appl. No.: 18/329,066

(22) Filed: Jun. 5, 2023

(51) Int. Cl.
*G10L 15/06* (2013.01)
*G10L 15/08* (2006.01)
*G10L 15/18* (2013.01)
*G10L 15/22* (2006.01)

(52) U.S. Cl.
CPC ........ *G10L 15/063* (2013.01); *G10L 15/1815* (2013.01); *G10L 15/22* (2013.01); *G10L 2015/0635* (2013.01); *G10L 2015/088* (2013.01)

(58) Field of Classification Search
CPC ... G10L 15/063; G10L 15/1815; G10L 15/22; G10L 2015/0635; G10L 2015/088
See application file for complete search history.

(56) References Cited

U.S. PATENT DOCUMENTS

| | | | | |
|---|---|---|---|---|
| 10,872,599 B1* | 12/2020 | Wu | .......................... | G10L 15/08 |
| 2013/0289987 A1* | 10/2013 | Ganapathiraju | ........ | G10L 15/04 704/236 |
| 2019/0236417 A1* | 8/2019 | Yun | ..................... | G06F 18/2178 |
| 2021/0280196 A1* | 9/2021 | Suzuki | ..................... | G10L 17/04 |
| 2023/0046763 A1* | 2/2023 | Komeiji | ................ | G10L 15/063 |
| 2023/0206898 A1* | 6/2023 | Stanton | ................. | G10L 13/027 704/260 |
| 2023/0239800 A1* | 7/2023 | Wang | ................ | H04W 52/0254 370/311 |
| 2023/0267919 A1* | 8/2023 | Ponçot | .................... | G10L 15/22 704/251 |
| 2024/0303431 A1* | 9/2024 | Annadi | ................... | G06F 40/40 |
| 2025/0006178 A1* | 1/2025 | Li | .......................... | G10L 15/183 |

* cited by examiner

*Primary Examiner* — Michael Colucci
(74) *Attorney, Agent, or Firm* — Pierce Atwood LLP

(57) ABSTRACT

A system performs federated learning and retraining of a machine learning model used for processing audio detected by a user device. The system uses both gradient data (which may correspond to false-rejects) and audio data (which may correspond to false-positives) received from devices. The system may also use a teacher model to produce labels for data in an automated fashion, thus allowing retraining to happen in an unsupervised manner.

20 Claims, 14 Drawing Sheets

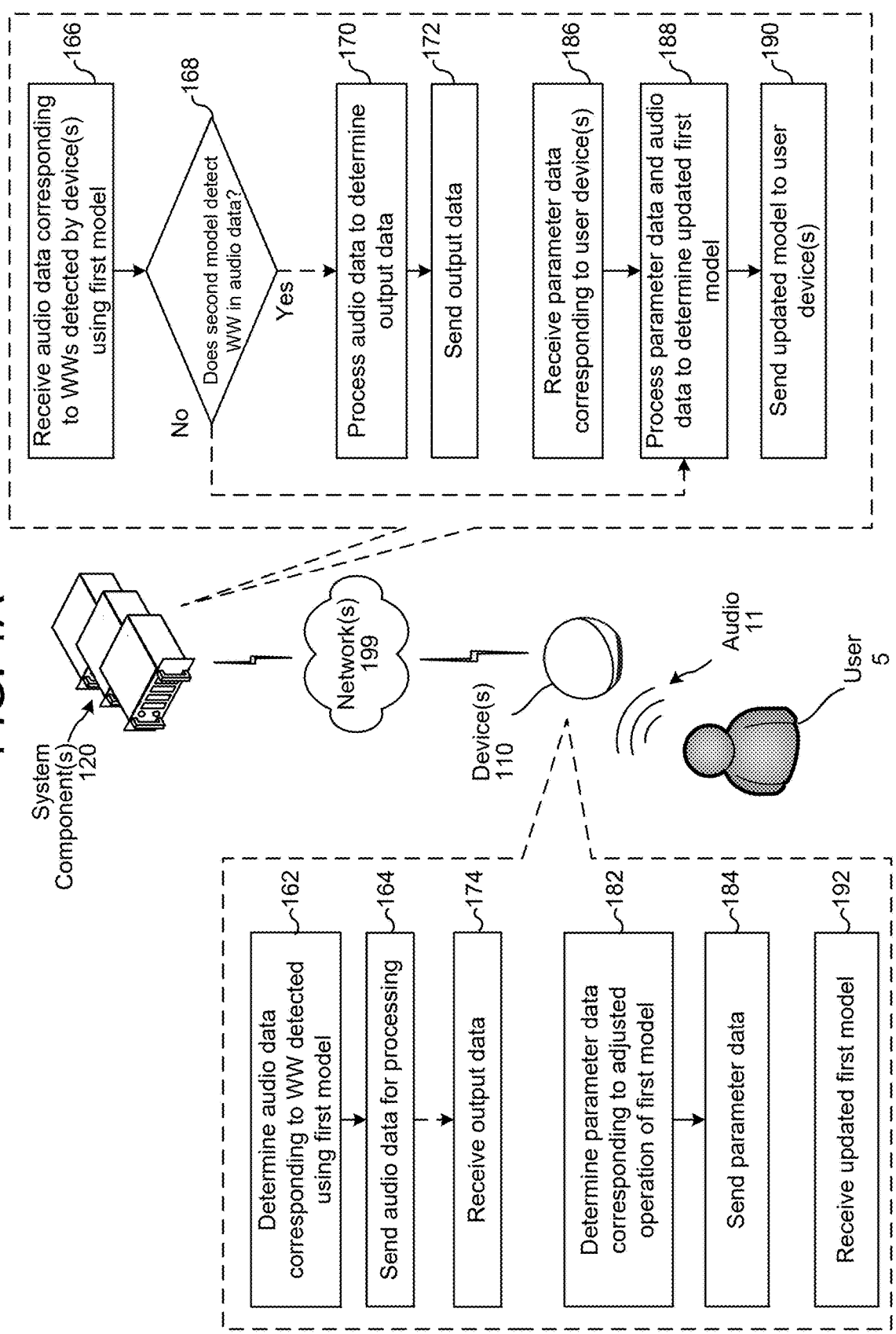

FEDERATED LEARNING FOR AUDIO PROCESSING

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A-1B are conceptual diagrams illustrating a virtual assistant system 100 for natural language processing and model retraining, according to embodiments of the present disclosure.

DETAILED DESCRIPTION

Figure 1B:
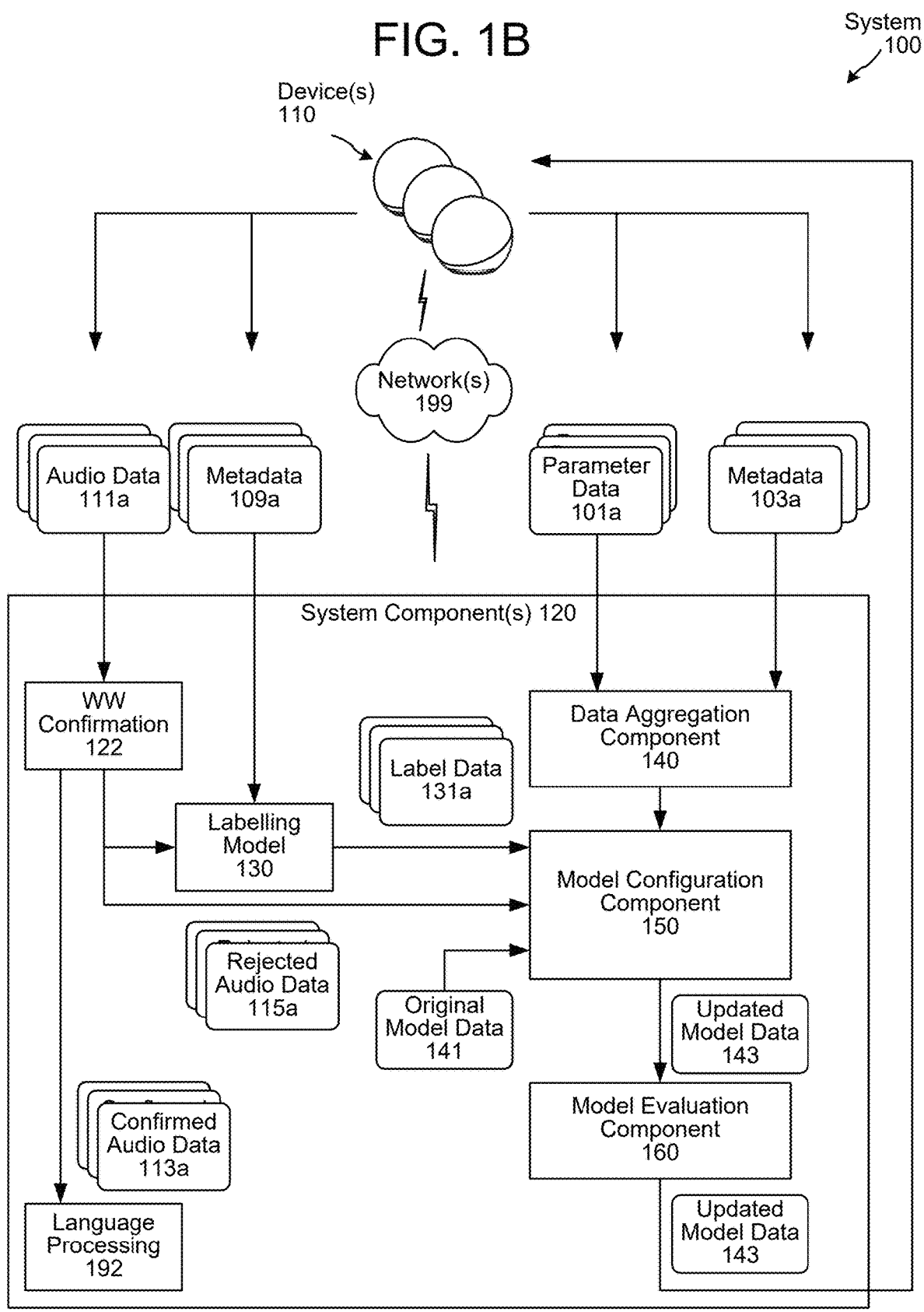

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Natural Language Generation (NLG) includes enabling computers to generate output text or other data in words a human can understand, such as sentences or phrases. Text-to-speech (TTS) is a field of computer science concerning transforming textual and/or other data into audio data that is synthesized to resemble human speech. ASR, NLU, NLG, and TTS may be used together as part of a speech-processing/virtual assistant system.

A voice-controlled device and/or other audio-receiving system component(s) may be configured to receive a spoken user input and detect a wakeword and/or other text in the user input; determine a command in the user input; and provide a response to the command. A user may thus interact with the voice-controlled device, another device, and/or system by voice. In some embodiments, in response to the device detecting the wakeword, the user device may perform speech processing on audio data representing the speech of the user, and/or send the audio data to the system for processing. The system may further process the audio data to verify that it includes a representation of the wakeword and/or to determine the command and/or response. The device may then receive, from the system, output audio, video, or other data related to the response and/or other data required to perform an action associated with the response (e.g., a command to turn on a light).

Speech processing can be computationally expensive. That is, significant computing resources may be needed to process ASR, NLU, and command execution within a reasonable time frame. Because of this, a distributed computing environment may be used when performing speech processing. A typical distributed environment may involve a local device having one or more microphones configured to capture sounds from a user speaking and convert those sounds into an audio signal. The audio signal/data may then be sent to a downstream device for further processing, such as converting the audio signal into an ultimate command. The command may then be executed by a combination of devices depending on the command itself.

A computer system may use one or more machine learning models to process input data to make inferences and/or predictions. Such machine learning (ML) models may include artificial neural networks (NN) such as convolutional networks (CNN), recurrent neural networks (RNN), long short-term memory (LSTM), transformers, conformers, etc. A NN may be made up of one or more layers, with a layer including one or more cells (also referred to as artificial neurons). A cell may include a number of inputs and outputs. A cell may receive inputs and generate one or more outputs by performing one or more mathematical and/or logical operations described by one or more parameters of the cell. For example, a cell may take a weighted sum of input values and apply an activation function on the result to yield the output(s). Some cells may additionally perform operations based on a previous output, a memory state, a context signal, etc. A computer system may train a NN by various techniques to improve results of the NN with respect to a dataset by adjusting some or all of the parameters.

From time to time, ANN model parameters may be updated based on a new dataset. In some cases, a first device operating the model during runtime may wish to share model update data with a second device operating a similar model. The new dataset may represent user data or confidential information, which may prevent the first device from sharing the new dataset with the second device. The first device may, however, share information regarding the updated model parameters without sharing private or other type of human-understandable user data. For example, a device may share gradient data, which represents a difference between the value of certain parameters of an original model and the values of those parameters in a customized/retrained model that is customized for a specific runtime (e.g., user device-implemented) use. Such gradient data/parameter data thus may represent potential "improvements" over the general model based on use of the specific device. For example, a model for detecting the presence of a wakeword (as explained below) may be trained by a system for use generally across many different devices in many different runtime environments. Such a general model may be distributed to many different devices that operate in a runtime environment to allow specific devices to detect a wakeword. A specific device, however, may perform training or other operations that optimizes or otherwise customizes the general model for operation with that specific device (or group of devices). The differences between the general model and the customized model for on-device operation may be represented by gradient data. Further, many such runtime devices may operate, each determining their own gradient data corresponding to their respective runtime environments. The runtime device(s) may send the gradient data to a central system (such as a cloud system) which collects such gradient data from many different devices and incorporates that information when performing retraining or other type of update to determine a newer general model, which may then be distributed to many different devices for local operation. In this federated learning approach, information obtained at device level may be incorporated into a general model to allow for improved operation across many devices. As can be appreciated, depending on system configuration and use cases, many general models may be deployed and updated in this fashion. For example, one general model may correspond to processing (e.g., speech processing) for one region and may be updated using gradient/parameter data obtained for devices in that region while a different general model may correspond to processing for another region and may be updated using gradient/parameter data obtained for devices in that other region.

As noted above, one ML model that may be operated by a device may be included in a wakeword detection component. To ensure that the system only performs processing of audio data when intended, a device such as a smart speaker, in "earshot" of a user, may respond to certain commands to instruct the system to process audio. Such commands, which may be referred to as "wake" commands, instruct the system to process audio data to respond to an utterance which is represented in the audio data. One example of a wake command is speaking a wakeword, which causes the system to "wake" and perform speech processing. A local device may thus monitor audio to detect a predetermined and/or user-defined wakeword. When the device detects a wakeword in audio data captured by a microphone, the device may send the audio data to a system for speech processing for determining output content responsive to the received audio (and/or may perform some action on its own). To determine whether a wakeword is spoken, the device may compare the audio data to a stored wakeword signature. The device may use an ML model to process audio data to determine if a wakeword is represented in detected audio. The device may determine data representing a probability that the audio data includes a representation of the wakeword and may determine that this data corresponds to a negative detection of the word or a positive detection of the word. In some embodiments, the data includes a score, and determining that the data corresponds to a positive detection of the word includes determining that the score is greater than a threshold score. If the score is greater than the threshold score, then the device may determine that the wakeword is represented in the audio data and the device may send the audio data to another device for further processing (or take other appropriate action). If the score is less than the threshold score, then the device may determine that the wakeword is not represented in the audio data and may act accordingly, for example the device may not send the audio data to the other device. Embodiments of the present disclosure are not, however, limited to comparing a score to a threshold to determine positive or negative detection of the word. In some embodiments, one or more scores are determined for each of a plurality of time segments corresponding to the audio data; each score may correspond to one or more words or parts of words, such as phones or diphones. In some embodiments, one or more labels may be associated with audio data in each time segment indicating a positive or negative detection or the word.

In some instances, a user may utter a wakeword, but the device determines that the data corresponding the probability does not correspond to a positive detection of the wakeword. Sometimes this determination may be incorrect (e.g., the device does not detect a wakeword when one was spoken). This may result in the device not waking when the device otherwise should (i.e., a "false-negative" detection of the wakeword aka "false-reject"). In other instances, the device may determine that the wakeword was spoken when, in fact, it was not (i.e., a "false-positive" detection of the wakeword aka "false-accept"). On example such a "false-positive" is if a user says "A Lexus is a brand of car" and the wakeword is "Alexa". Another type of false-positive can occur when a device detects a wakeword that was spoken, but was not intended to wake the device, such as when the wakeword is used in a sentence in a conversation between two people (such as if the user says, "don't forget to turn off the computer" where "computer" is also another device's wakeword), or in content being played near the wakeword-enabled device (e.g., television, radio, song, etc.). Both false-negatives and false-positives may lead to diminished usefulness of the device, user frustration, and/or other undesirable effects.

Embodiments of the present disclosure improve speech processing systems by reducing or eliminating false-positive and/or false-negative detection of wakewords. In various embodiments, false-positives and/or false-negatives are detected using one or more of the various techniques described herein, and a trained model is updated based on the detection of the false-positive and/or false-negative. The updated trained model may thus reduce the number of future false-positives and/or false-negatives. In various embodiments, the updating of the model is performed using a combination of operations performed both at the device and by a another system component (or other higher power computing configuration).

The system may use federated learning techniques to preserve user privacy and avoid sharing user audio with other devices/components of the system. The user device may calculate gradients that represent changes to on-device ML models (and share the gradients with other devices/system components rather than audio data received by the user device). For example, a device may be more easily configured to detect false-negatives, which the device can use to adjust its operations, for example by reconfiguring a machine learning (ML) model configured to operate on audio data (e.g., a wakeword detector). Such a reconfiguration may be performed by, for example, back-propagating differences between a stored, expected wakeword and a wakeword represented in captured audio. This may result in updated parameter data, such as gradient weights, which may be sent to a training device without necessarily sending the audio data corresponding to the false-negatives. Each device may thus include a trained model updated one or more times to account for how a particular user or users speaks the wakeword, which may include differences due to an accent, speech impediment, background noise, or other such differences. In some embodiments, information related to the update to the trained model may be sent from one or more devices to one or more server devices, which may aggregate the update information.

The training devices may also have its own data which can be used to update models. For example, a model training system component may operate its own audio processing ML model (e.g., wakeword detection component) that may be more powerful (or differently configured) than those that operate by a user device. Such a system model may be configured to catch more false-positives. Thus, if a device detects a wakeword and sends corresponding audio data to a model training system component, the model training system can process the incoming audio data with its own ML model to confirm the detection of the wakeword. If no wakeword is detected, the system can identify that audio data as corresponding to a false-positive and use the audio data to further update a wakeword model. Thus the system may use audio data corresponding to false-positives, as well as parameter data (received by one or more devices) corresponding to false-negatives to update an audio processing ML model (such as a wakeword detection component). The system may then send the updated model down to one or more user devices, thus improving the device(s) ability to perform audio processing such as wakeword detection.

The system may process the received data in an online, streaming manner in which data received from a device is processed in real-time or near real time to determine whether it is to be used for model training. For example, when data is received, the system may determine whether data from the particular device is to be used for training. If so, the system may generate labels for the data. The system may determine whether to use the labeled data for model training based on various factors such as a confidence value associated with the label(s), the labels themselves, and/or indications from downstream processing of the received data. Data not selected for training can be discarded.

To determine which audio data available to the system is to be used for training, the system may include using a "teacher" model to process audio data received by a device (and potentially indicated as corresponding to a false-positive) to generate a labeled dataset in an automated fashion without requiring the labels to be generated by a human operator, thus avoiding delays that may be associated with human annotation.

If the labeled data is selected for model training, the system may use the labeled dataset to retrain a "student" model (e.g., calculate gradient data for updating the student model). The student model may be at least substantially the same as (e.g., a duplicate of), or similar to an NN model component configured to operate on a device (for example the wakeword detection ML model or the like). Following gradient calculation, the received data may be deleted. Gradient data may be aggregated based on various characteristics and/or device types, and the model may be iterated (in some implementations, subject to validation). Following an iteration, the gradient data may be deleted. The system may validate the updated student model to determine, for example, whether it exhibits improved performance when processing the newly received data and/or historical data. Thus, from time to time (e.g., after a certain number of iterations, a predetermined period of time, after achieving a certain improvement in model performance), a validated updated ML model (and/or data corresponding thereto) may be sent to the devices. The system may distribute entirely new models or simply may send model update data, which may include gradient/weight data that a device may use to update its own local model. In this manner, the system can perform continuous learning without persisting the received data or gradients.

Although the description herein focuses on performing operations to retrain a wakeword model, the teachings may also apply to retraining other models where one set of data is determined by local device(s) (e.g., parameter data corresponding to false-negatives) and another set of data is determined by system computing component(s) (e.g., audio data corresponding to false-positives). For example, the teachings herein may be used to update a language processing model such as a model used for ASR and/or NLU. The teachings herein may also be used to retrain a model used for user recognition (such as one incorporated in user recognition component 595 discussed below). The teachings herein may also be used to retrain a model used for sentiment detection (such as one incorporated in sentiment detection component 575 discussed below). The teachings herein may also be used to retrain a model used for acoustic event detection (such as one incorporated in acoustic event detection component 573 discussed below). The teachings herein may also be used to retrain a model used to determine if an input was system directed (such as one incorporated in system directed detection component 585 discussed below). In addition to being configured to update models for various purposes, the present techniques may also be used to update models of different configurations such as neural networks, binary classifiers, multiclass classifiers, regression models, support vector machines, large language models (LLMs), and many other types of models. Specifically, as discussed below, the teachings herein allow models to be retrained using a combination of parameter/gradient data determined by runtime device(s) as well as a large collection of determined false examples (such as false-positives determined by centralized component(s)) as determined by potentially larger and more powerful version(s) of models being operated by runtime devices.

Teachings of the present disclosure may be configured to incorporate user permissions and may only perform activities disclosed herein if approved by a user. These permissions may include a grant (or denial) to use a particular component/method. The systems, devices, components, and techniques described herein may thus be configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIGS. 1A-1B are conceptual diagrams illustrating a virtual assistant system 100 for natural language processing, according to embodiments of the present disclosure. As shown in FIG. 1A, the virtual assistant/natural language command processing system 100 may include a voice-enabled device 110 local to a user 5, one or more system component(s) 120 (e.g., components that can execute various functions of the system 100), and one or more skill support system component(s) 525 (e.g., components that can execute various functions corresponding to one or more skills 590 shown in FIG. 5) connected across one or more networks 199. Although the figures and discussion of the present disclosure illustrate certain steps in a particular order, the steps described may be performed in a different order (as well as certain steps removed or added) without departing from the present disclosure.

The device 110 may receive audio corresponding to a spoken natural language input (such as an utterance) originating from the user 5. The device 110 may process audio following detection of a wakeword. The device 110 may generate audio data corresponding to the audio, and may send the audio data to the system component(s). The device 110 may send the audio data to the system component(s) via an application that is installed on the device 110 and associated with the system component(s). An example of such an application is the Amazon Alexa application that may be installed on a smart phone, tablet, or the like. In some implementations, the device 110 may receive text data 513 corresponding to a natural language input originating from the user 5, and send the text data to the system component(s). The device 110 may also receive output data from the system component(s), and generate a synthesized speech output. The device 110 may include a camera for capturing image and/or video data for processing by the system component(s). Examples of various devices 110 are further illustrated in FIG. 12. The system component(s) 120 may be remote system component(s) such as a group of computing components located geographically remote from device 110 but accessible via network 199 (for example, servers accessible via the internet). The system component(s) 120 may also include system component(s) that are physically separate from device 110 but located geographically close to device 110 and accessible via network 199 (for example a home server located in a same residence as device 110). System component(s) may also include some combination thereof, for example where certain components/operations are performed via a home server(s) and others are performed via geographically remote server(s)/computing component(s). The system component(s) 120 may include speech processing components and/or model training components as described herein.

The device 110 may operate a number of components using ML models such as, shown in FIG. 5 below, a wakeword detection component 520, user recognition component 595, system directed detector 575, sentiment detection component 575, acoustic event detection component 573, or the like. The device 110 may process audio data using any such ML models and the teachings herein may apply to retraining any such models using the techniques described. For illustration purposes, the discussion focuses on operation and retraining of an ML model used in a wakeword detection component 520.

The trained models, ML models, and/or other models described herein, which are implemented by components of the system, may be trained and operated according to various machine-learning techniques. Such techniques may include, for example, neural networks (such as deep neural networks (DNNs) and/or recurrent neural networks (RNNs)), inference engines, and trained classifiers. Examples of trained classifiers include Support Vector Machines (SVMs), neural networks, decision trees, adaptive boosting (AdaBoost) combined with decision trees, and random forests. For example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

A device 110 may operate a wakeword detection component (e.g., 520 shown in FIG. 5) may implement one or more trained models trained using user specific speech processing data. The wakeword detection component 520 may be configured with trained models trained with respect to a large number of users, particular subsets of users, or a custom group (or single) respective user(s). Thus, the device 110 may perform user recognition processing to determine a current user, and send an indication of same to the wakeword detection component 520 so the wakeword detection component can implement one or more trained models trained with respect to the current user.

As described above, the wakeword detection component 520 may implement device specific and/or user specific machine learned models. However, one skilled in the art will appreciate that one or more machine learned models may be trained using both device specific speech processing data and user specific speech processing data. The more data types used to train a machine learning model, the more accurate a resulting trained model will be in predicting whether the wakeword detection sensitivity should be lowered. For example, other data that may be used to train a machine learning model includes a type of the device 110, a location of the device 110 (e.g., a geographic location or a location with a building), etc.

As shown in FIG. 1A, a device 110 may detect audio 11 using one or more microphones, determine audio data representing the audio, and determine (162) that the audio data corresponds to a wakeword (WW) detected by a first model (e.g., an ML model used in a wakeword detection component 520). If no wakeword is detected by the device 110, the device 110 may discard the audio data and continue processing incoming audio for a detected wakeword. As the wakeword was detected, the device 110 may send (164) the audio data to system component(s) 120 for further processing. The device 110 may also send metadata 109 (shown in FIG. 1B) to the system component(s) 120 along with the audio data 111.

The system component(s) 120 may receive (166) the audio data corresponding to the device detecting the wakeword. The system component(s) 120 may then perform its own processing (168) to confirm if the received audio data represents the wakeword. Such processing may be performed by wakeword confirmation component 122. If the wakeword is detected as a result of the processing by the wakeword confirmation component 122 (168: Yes) the system may process (170) the audio data to determine output data. Such processing may involve, as shown in FIG. 1B, sending audio data confirmed to include a wakeword representation (referred to as confirmed audio data 113) to language processing component(s) 192. As shown in FIG. 5 and further discussed below, operations by the language processing component 192 may include ASR processing, NLU processing, the results of which may be passed for processing/various actions being taken by other components such as orchestrator 530, skill component(s) 590/525, or the like. A further description of processing of audio data to execute a command is found below. Returning to FIG. 1A, the resulting output data (which may be responsive to the user's utterance/natural language input) is sent (172) from the system component(s) 120 to the device 110. The device 110 receives (174) the output data and presents the output data to the user 5.

At other times of operation, the device 110 may determine (182) parameter data corresponding to adjusted operation of a first model, for example an ML model used in wakeword detection component 520. This may occur in a number of ways. Depending on system configuration, device 110 may be configured to determine when its operations based on an ML model may not have been correct, which may result in the device retraining the ML model, determining updated gradient data, or performing some other operations which result in adjusted operations of the model and corresponding parameter data.

In one example, a device 110 may determine that it may have failed to detect a spoken wakeword if it detects instances of human speech within a certain time frame of each other, where the device 110 did not detect a wakeword in a first instance of human speech but did detect a wakeword in a second instance of human speech shortly following the first (which may represent the user saying the wakeword, the device 110 missing the wakeword, and the user repeating herself). In such as situation, the device 110 may be configured to determine that it failed to detect a wakeword and may take steps accordingly to adjust its operation. More specifically, if a wakeword detection component 520 is configured to determine a wakeword is present if an ML model outputs a wakeword confidence of, for example, over 80%, if a first utterance processed by the ML model results in a 70% confidence (e.g., an output of no wakeword detected) but a second utterance processed by the ML model results in a 90% confidence (e.g., an output of a wakeword detected) and the second utterance is within some time threshold (for example, three seconds) of the first, the device 110 may determine that a false-negative detection occurred and may take steps to adjust its model. Note that such steps may only occur if the confidence score for the first utterance is above some other threshold (e.g., 60% confidence which may correspond to a "near-miss") to avoid retraining unnecessarily.

Figure 2:
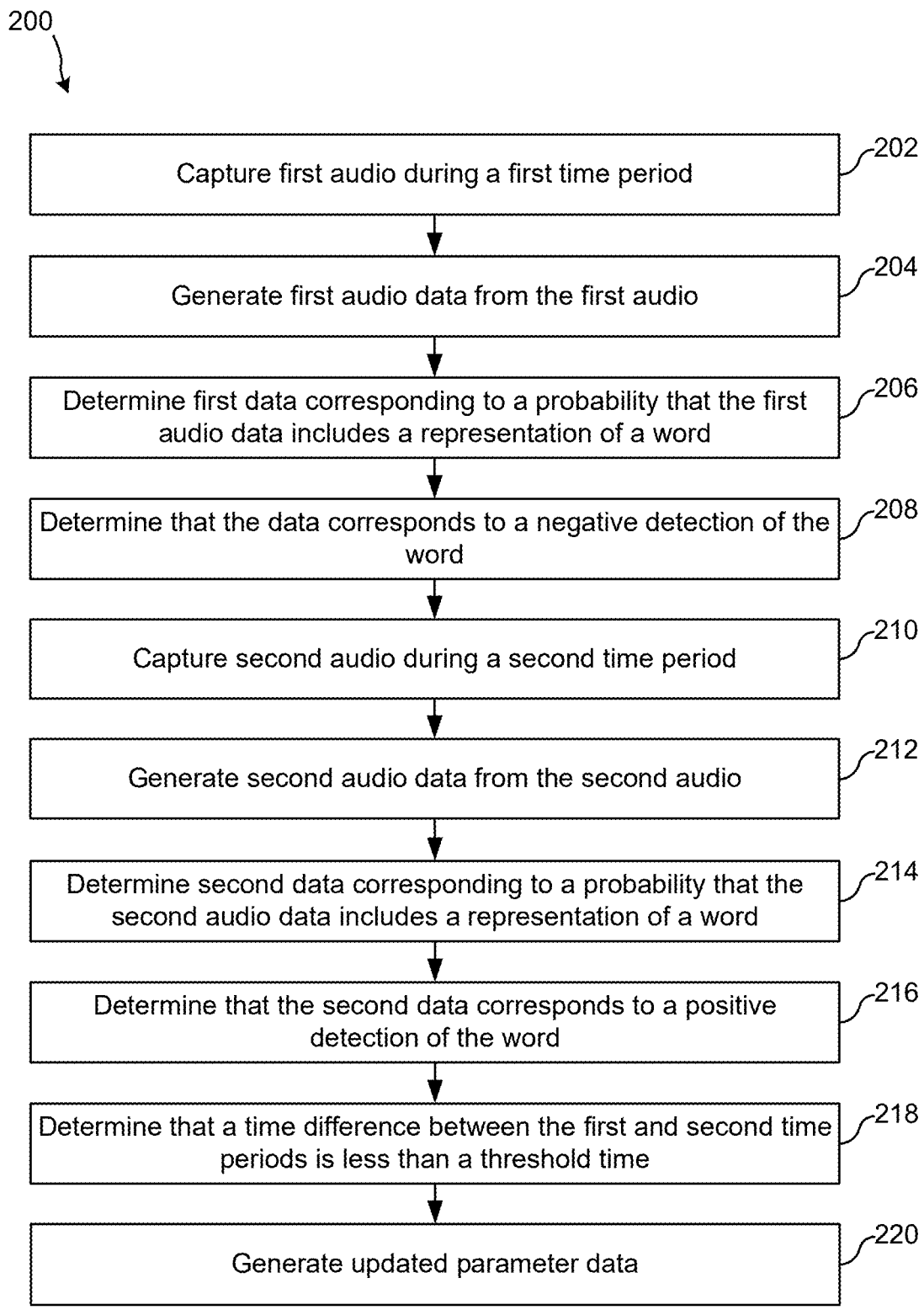
FIG. 2 is a process flow diagram illustrating how a device may update a machine learning model after determining a false-negative detection of a word according to embodiments of the present disclosure.

FIG. 2 illustrates a process flow 200 for detecting a false-negative detection of a wakeword. The device 110 captures (202) first audio during a first time period and generates (204) first audio data from the first audio. The device 110 determines (206) first data (e.g., a first score or first label) corresponding to a probability that the first audio data includes a representation of a word (e.g., a wakeword) and determines (208) that the first data corresponds to a negative detection of the wakeword (i.e., the wakeword is not present in the first audio) by, for example, determining that an associated score is less than a threshold score. During a second time period after the first time period, the device 110 captures (210) second audio and generates (212) second audio data using it. The first time period and the second time period may each be any length of time and may be defined by, for example, their starting and finishing times or their starting and duration times. The lengths of the first time period and the second time period may vary or may be fixed. A time difference between the first time period and the second time period may be computed by, for example, determining the difference in their starting times, ending times, midpoint times, or start and end times. The device 110 determines (214) second data (e.g., a second score) corresponding to a probability that the second audio data includes a representation of the word and determines (216) that the second data corresponds to a positive detection of the wakeword (e.g., that the second score is greater than the threshold score). The device 110 determines (218) that a time difference between the first and second time periods is less than a time threshold. The time threshold may be, for example, one second, two seconds, five seconds, or any other time. As described herein, if a user utters a wakeword but the device 110 does not wake, the user is likely to repeat the wakeword soon after (e.g., one, two, or five seconds after). The device 110 may detect the repeated wakeword because the user speaks it more loudly, more clearly, and/or with less background noise. Based on the time difference, the device 110 determines that the first score corresponds to a false-negative detection of the wakeword. The device 110 thus may generate an updated trained model using the first audio data (e.g., using a difference between the first audio data and a stored representation of the wakeword).

The device 110 may update the ML model of the wakeword detection component 520 by computing a gradient by comparing audio data with a stored representation of a wakeword and back-propagating error data based thereon. In some embodiments, the ML model includes additional forward pass targets that estimate synthetic gradient values and the device 110 updates the ML model by selecting one or more synthetic gradient values. The model may be updated by, for example, back-propagating the error data from output nodes back to hidden and input nodes; the method of back-propagation may include gradient descent. The device 110 may also determine other parameter data such as adjusted weights, weight difference values, etc.

In some embodiments, the ML model is a DNN that is trained using distributed batch stochastic gradient descent; batches of training data may be distributed to computation nodes where they are fed through the DNN in order to compute a gradient for that batch. The device 110 may update the DNN by computing a gradient by comparing audio data with a stored representation of a wakeword and back-propagating error data based thereon. In some embodiments, the DNN includes additional forward pass targets that estimate synthetic gradient values and the device 110 updates the DNN by selecting one or more synthetic gradient values.

The device 110 may thus generate (220) updated parameter data corresponding to adjusted operation of the ML model.

Returning to FIG. 1A, the device 110 may send (184) the resulting parameter data to the system component(s) 120. In some embodiments, the device 110 analyzes the parameter data prior to using it to update the trained model and/or sending it to the system component(s) 120; if the parameter data fails to satisfy some condition/threshold (for example corresponding to a significant difference in operation of the ML model), the device 110 may not use it to update the ML model or send it to the system component(s) 120.

The device 110 may gather parameter data for sending to the system component(s) 120 in batches. For example, to conserve computing resources for user-facing operations, the device 110 may only send parameter data to the system component(s) 120 during times of low user operation, such as in the middle of the night. As shown in FIG. 1B, the parameter data 101, which may correspond to adjustments made based on false-rejects detected by the device 110, may be sent from the device 110 to the system component(s) 120. Such false-rejects may correspond to operation(s) by the device 110, of the ML model, where the device 110 was able to determine that the output data from the ML model was incorrect, resulting in the device 110 determining the parameter data to adjust operation of the ML model, for example to correct whatever led the model to be incorrect. The device 110 may also send to the system component(s) 120 metadata 103 which corresponds to the parameter data 101. The metadata 103 may indicate certain information that the system 100 may use in retraining an ML model. For example, the metadata 103 may indicate a device ID, device type, user profile ID, particular wakeword the ML model was retrained for, a particular ID corresponding to the specific model/model type that was retrained, time data corresponding to a time window of the retraining, or other data. Thus, one particular set of metadata (e.g., 103a) may correspond to a particular set of parameter data (e.g., 101a).

As shown in FIG. 1B, multiple different devices 110 may send parameter data 101 and metadata 103. Thus, multiple more devices 110 may detect wakeword-detection/audio processing errors, generate parameter data/metadata based thereon (as described herein), and send the parameter data/metadata to the system component(s) 120. This allows the system component(s) 120 to aggregate parameter data/metadata for purposes of model retraining as described herein.

The system component(s) 120 may receive (186) the parameter data and may use parameter data/metadata for purposes of model retraining. In doing so the system component(s) 120 may receive parameter data from a variety of device(s) 110, aggregate the parameter data, configure a retrained/updated model, and distribute that model to the device(s) 110. Such a federated learning approach would allow many different device(s) 110 to benefit from observations made by other device(s) 110 (as reflected in each device's parameter data) which are thus incorporated in the updated model. Further, by only sending the gradient data from the device 110, the device maintains the privacy of audio data it believes does not include the wakeword.

In certain circumstances, the system component(s) 120 may only rely on such parameter data/metadata for purposes of model retraining. One drawback to that approach, however, is that doing so may skew the retraining of the model in favor of correcting for false-rejects, which may overcorrect the model into performing more false-accepts. As the parameter data 101 may be determined by a device as the result of correcting for a false-reject (for example as discussed in reference to FIG. 2), a large group of such parameter data 101a-101n may result in a skewed updated model. To avoid such skewing, and to update a more balanced model, the system may also make use of other audio data it has available. In one example the system 100 may make use of other available datasets, but those datasets may need to be curated ahead of time, which may involve complex tasks to configure the dataset such as human annotation, data sorting, etc.

To improve the overall training process, the system 100 may make use of audio data that was sent to the system component(s) 120 by one or more device(s) 110, where the devices 110 believed the audio data included the wakeword, but the system component(s) 120 concluded did not actually include the wakeword. Thus, the system component(s) 120 may also retrain using audio data corresponding to false-accepts. By using gradient data corresponding to false-rejects and audio data corresponding to false-accepts, the system may configure and updated ML model that is more balanced and improves system operation and does so in a more automated fashion that is less reliant on human annotators.

To determine what audio data is to be used in model retraining, the system performs operations further illustrated in FIGS. 1A and 1B. Returning to FIG. 1A, as noted, when a device 110 sends audio data to the system component(s) 120, the system component(s) 120 may process (168) the audio data to determine if a wakeword is included. To do so, the system component(s) 120 may process the received audio data with a wakeword confirmation component 122. As the system component(s) 120 may operate using significantly more computing resources than device 110, the wakeword confirmation component 122 may be a larger, more robust, and higher processing wakeword detector than the on-device wakeword detector 520. Thus, the wakeword confirmation component 122 of the system component(s) 120 may be more accurate than the on-device wakeword detector 520. Thus, in certain instances, even though a device 110 may have detected a wakeword and sent audio data to the system component(s) 120, the system component(s) 120 may determine that a wakeword was not represented in the audio data 111 sent by the device 110 (168: No), thus indicating that the audio data corresponds to a false-accept by a device 110. Such audio data may be referred to as rejected audio data 115 as shown in FIG. 1B as it was rejected by the wakeword confirmation component 122. Rejected audio data 115 traditionally may not be sent to language processing component 192 for purposes of determining a response to the user. It may either be deleted or potentially used for retaining the ML model as an example of a false-accept. (As noted below, rejected audio data 115 may be sent to language processing component 192 for purposes of determining ASR results data and/or NLU results data which may be used by a teacher model as part of model retraining shown below.)

For purposes of using the rejected audio data 115 for training, it is desirable to determine label data for each instance of audio data to be used, thus providing sufficient ground truth data for training purposes. In certain instances, the audio data may be reviewed by a human annotator to provide the label data. While doing so may result in highly accurate label data, it may also involve significant human resources and may be undesirable in terms of the amount of time necessary to determine corresponding labels. Further, in certain instances there may be privacy concerns by maintaining rejected audio data 115 for too long. For example, if it turns out the rejected audio data 115 actually does not include the wakeword, it may mean that the user 5 did not intend for the audio data to leave the device 110. Thus certain configurations may require deletion of that audio data within a certain period of time (e.g., 24 hours). Thus, if such rejected audio data 115 is to be used for model re-training, it may need to be used within a certain period of time and then deleted. Thus, the system 100 may use a labelling model 130 instead of human annotators to determine label data 131. As can be appreciated, one particular set of label data (e.g., 131a) may correspond to a particular set of rejected audio data (e.g., 115a).

The labelling model 130 may be considered a "teacher model" that determines the label data 131 which is used to "teach" the (e.g., create an updated) ML model, for example a new model for wakeword detection component 520. The teacher model (e.g., labelling model 130) may be a larger, more powerful model that can produce more accurate output (e.g., the label data 131) than the wakeword confirmation model 122 or wakeword detection component 520. The resource requirements of the labelling model 130 may be prohibitive for use in real-time/low latency processing. Thus, for example, the wakeword confirmation component 122 may need to operate fast enough to determine quickly if audio data includes the wakeword (e.g., is confirmed audio data 113 that should be sent to language processing component 192) or if audio data is rejected audio data 115 and should not be processed by language processing component 192. The labelling model 130, however, may use additional resources as it does not need to complete its processing while a user awaits results. The labelling model 130 may also use other data, such as metadata 109, speech processing results data, etc. to determine the final label data 131.

Figure 3:
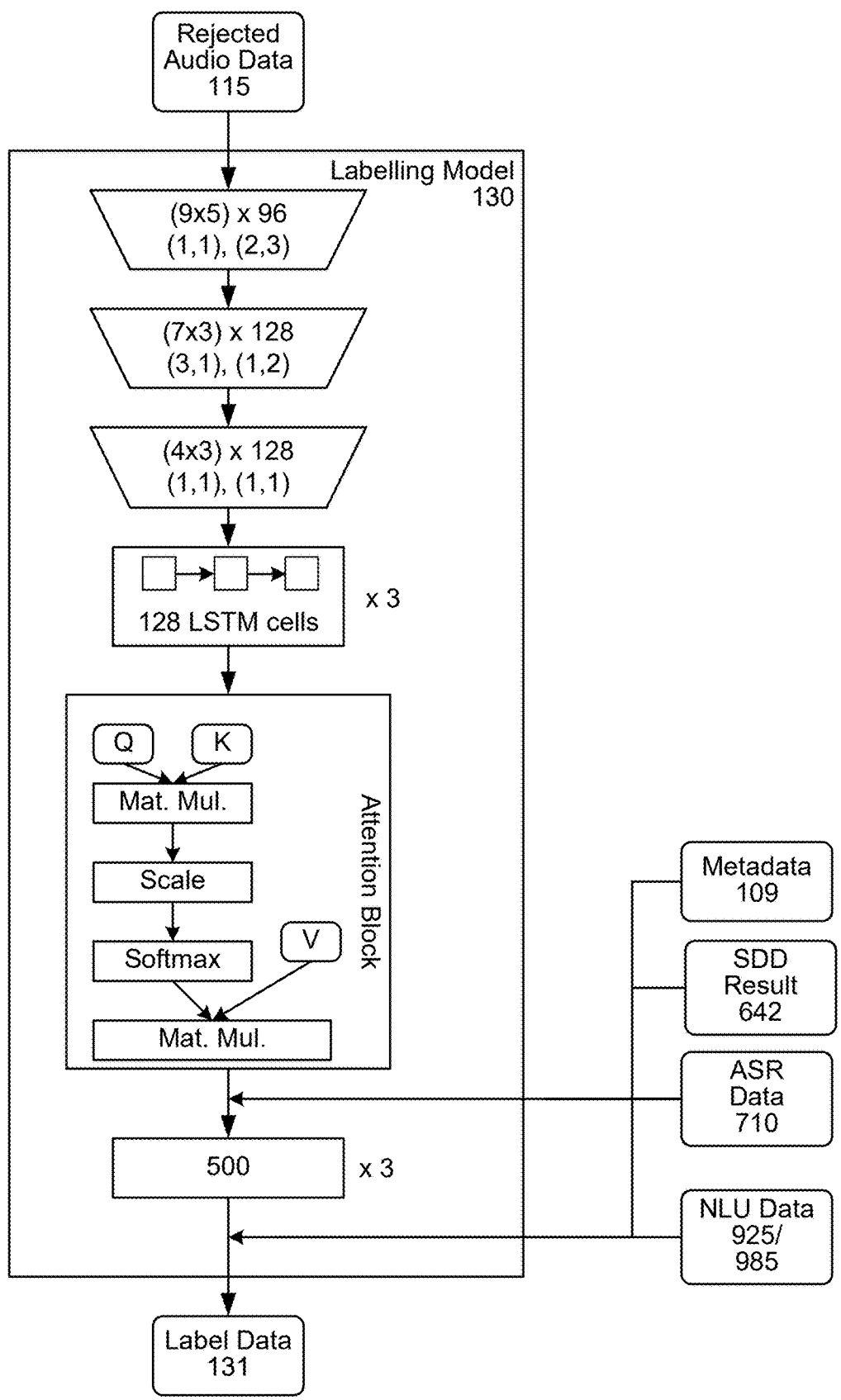
FIG. 3 illustrates an example teacher/labelling model that may determine label data to be used in model training according to embodiments of the present disclosure.

An example configuration of labelling model 130 is shown in FIG. 3. As shown, the labelling model 130 may include various blocks such as convolution layers, LSTM cell(s), an attention block, etc. As shown, the labelling model 130 may processing rejected audio data 115 as well as metadata 109, SDD result data 642, ASR results data 710, and/or NLU results data 925/985. (SDD result data 642, ASR results data 710, and/or NLU results data 925/985 are described below.) Thus, in certain configurations, rejected audio data 115 may be sent to language processing component 192 for purposes of determining the ASR results data 710, and/or NLU results data 925/985, though such processing may happen in a time-delayed manner as such results are used by the labelling model 130 rather than being used to determine a user output, which requires lower latency. The SDD result data 642, ASR results data 710, and/or NLU results data 925/985 may also include corresponding score data which may indicate the confidence of the respective processing with regard to the rejected audio data 115. For example, a high ASR score but low NLU score/SDD score may indicate that the system 100 accurately transcribed the user's audio but it is unlikely the user's audio was intended for the system to process. The metadata 109, SDD result data 642, ASR results data 710, and/or NLU results data 925/985, may be processed by various components of the labelling model 130 to ultimately determine the label data 131.

As noted above, the metadata 109 may be received by device 110 and may correspond to the received audio data 111 (e.g., a particular set of rejected audio data 115). Thus one particular set of metadata (e.g., 109a) may correspond to a particular set of audio data (e.g., 111a/115a). As shown in FIG. 1B, multiple different devices 110 may send audio data 111 and metadata 109. Such metadata 109 may include information related to device type, the invoked wakeword, the state of an alarm on the device 110 (e.g., whether the device 110 was outputting an alarm at the time audio was captured), the state of playback of the device 110 (e.g., whether the device 110 was outputting other audio or visual content at the time audio was captured), audio background signal strength, audio stream identifier, time since last detected wakeword, time since last detected near miss of a wakeword, utterance identifier, identifier of the user of the device (e.g., specifying a user/user profile as determined by a user recognition component 595 of the device 110), or other information.

The label data 131 may include a label as to whether the rejected audio data 115 corresponds to a true wakeword-invoked (e.g., system-directed) utterance or whether the rejected audio data 115 does not include a wakeword (e.g., corresponds to a false-accept). The label data 131 may also include score data corresponding to a confidence of the label.

Various sets of label data and corresponding rejected audio data (e.g., 113a/115a-113n/115n) may be configured into a training dataset and sent to model configuration component 150. The model configuration component 150 may also receive parameter data 101 and metadata 103. When received by the system component(s) 120, the parameter data 101 and metadata 103 may stored by a data aggregation component 140. The data aggregation component 140 may hold the parameter data 101 and metadata 103 until such time as a sufficient amount of such data is received to perform a meaningful retraining (along with label data 131 and rejected audio data 115) of the ML model. Thus, model retraining may be performed in response to stored parameter/metadata satisfying a particular condition, such as a certain amount of data being available, a certain amount of data being received from a sufficient number of different devices, etc. Depending on system configuration, parameter data 101 and metadata 103 may be received less frequently than audio data 111/metadata 109. Thus the availability of parameter data 101/metadata 103 may act as a gating factor to model retraining.

The model configuration component 150 may receive parameter data 101, metadata 103, label data 131, and rejected audio data 115. Although not shown, in certain examples the system 100 may also send to the labelling model 130 certain confirmed audio data 113 so that the model configuration component 150 may also receive a retraining dataset that includes confirmed audio data 113 and corresponding label data 131 determined by the labelling model 130. The model configuration component 150 may also receive original model data 141 which may correspond, for example, to the ML model being operated by the device(s) 110 that is to be retrained. For example, the ML model may correspond to the wakeword detection component 520.

Referring back to FIG. 1A, the system 100 may process (188) the parameter data and audio data to determine an updated first model. To do so the model configuration component 150 may process the various input data to determine updated model data 143. The updated model data 143 may correspond to an updated version of original model data 141 which adjusts the model operation to account for the desired corrected behavior, for example correcting for the false-rejects reflected in the parameter data 101 and metadata 103 and the false-accepts reflected in the label data 131 and rejected audio data 115. When selecting data for purposes of model retraining the system 100 may determine how much parameter data 101 to use versus how much rejected audio data 115 to use in a ratio that results in the desired ultimate updated model data 143 and is thus configurable.

When determining an updated model, the system 100 may select data to be considered for the retraining based on one or more characteristics associated with the data. Such characteristics may be indicated in metadata 103 and/or metadata 109 or in some other data. Various such characteristics may be considered. Such characteristics may include device type, device hardware configuration, device location, noise conditions, alarm conditions, playback conditions, number of users present at utterance capture time, and/or other data. Such characteristics may also include user characteristics (which may be determined using user profile data) such as user age, user native language, user accent, user age, user location, etc. Thus, for example, the system 100 may group together for retraining purposes parameter data 101 and rejected audio data 115 corresponding to Echo Show devices owned by users in Australia. In another example the system 100 may group together for retraining purposes parameter data 101 and rejected audio data 115 corresponding to high-noise environmental conditions. Various other groupings of data may also be performed.

The model configuration component 150 may thus retrieve, from a model storage, the original model data 141 corresponding to the ML model to be retrained and may receive the appropriate rejected audio data 115 and parameter data 101 (and corresponding metadata 103 and metadata 109) to be used for retraining. The model configuration component 150 may calculate gradient data based on an error between labels of the labeled training dataset and labels predicted by the original model based on the audio data in the labeled training dataset and/or the parameter data 101. The model configuration component 150 may output updated model data 143, which may consist of the gradient data calculated for the labeled training dataset, or aggregated gradient data calculated for multiple labeled training datasets. In some implementations, the model configuration component 150 may calculate different gradient data using different training parameters; for example, different device selection criteria, different data selection criteria, different data aggregation techniques, different loss functions, different combinations of new versus historical training data, etc. The updated model data 143 may include an entirely new model, new gradient data, gradient difference data, and/or other data corresponding to the updated/retrained model. The model configuration component 150 may thus send the updated model data 143 to the model evaluation component 160.

The model evaluation component 160 may perform various operations to determine if the updated model data 143 is sufficient to be distributed. For example, the model evaluation component 160 may test the updated model to make sure it performs as expected under various conditions for example different noise conditions, different playback conditions, for different voices (e.g., male, female, different accents, different ages, etc.). The model evaluation component 160 may also evaluate the updated model data 143 to ensure it is sufficiently different from original model data 141 before distributing (to avoid making only incremental changes). After the model evaluation component 160 determines the updated model data 143 is appropriate for distribution, it may send the updated model data 143 to device(s) 110. Thus completing the system operations from FIG. 1A, as shown, where the system component(s) send (190) the updated model to the user device(s) 110.

As can be appreciated, and as discussed herein, the techniques described herein can be used to update models for performing various operations, not just those limited to wakeword detection. In certain configurations the models/updated models may be configured to operate on audio data. For example, the teachings herein may be used to update a language processing model such as a model used for ASR and/or NLU. The teachings herein may also be used to retrain a model used for user recognition (such as one incorporated in user recognition component 595 discussed below). The teachings herein may also be used to retrain a model used for sentiment detection (such as one incorporated in sentiment detection component 575 discussed below). The teachings herein may also be used to retrain a model used for acoustic event detection (such as one incorporated in acoustic event detection component 573 discussed below). The teachings herein may also be used to retrain a model used to determine if an input was system directed (such as one incorporated in system directed detection component 585 discussed below). In other configurations, the models/updated models may be configured to operate on other kinds of data.

Figure 1C:
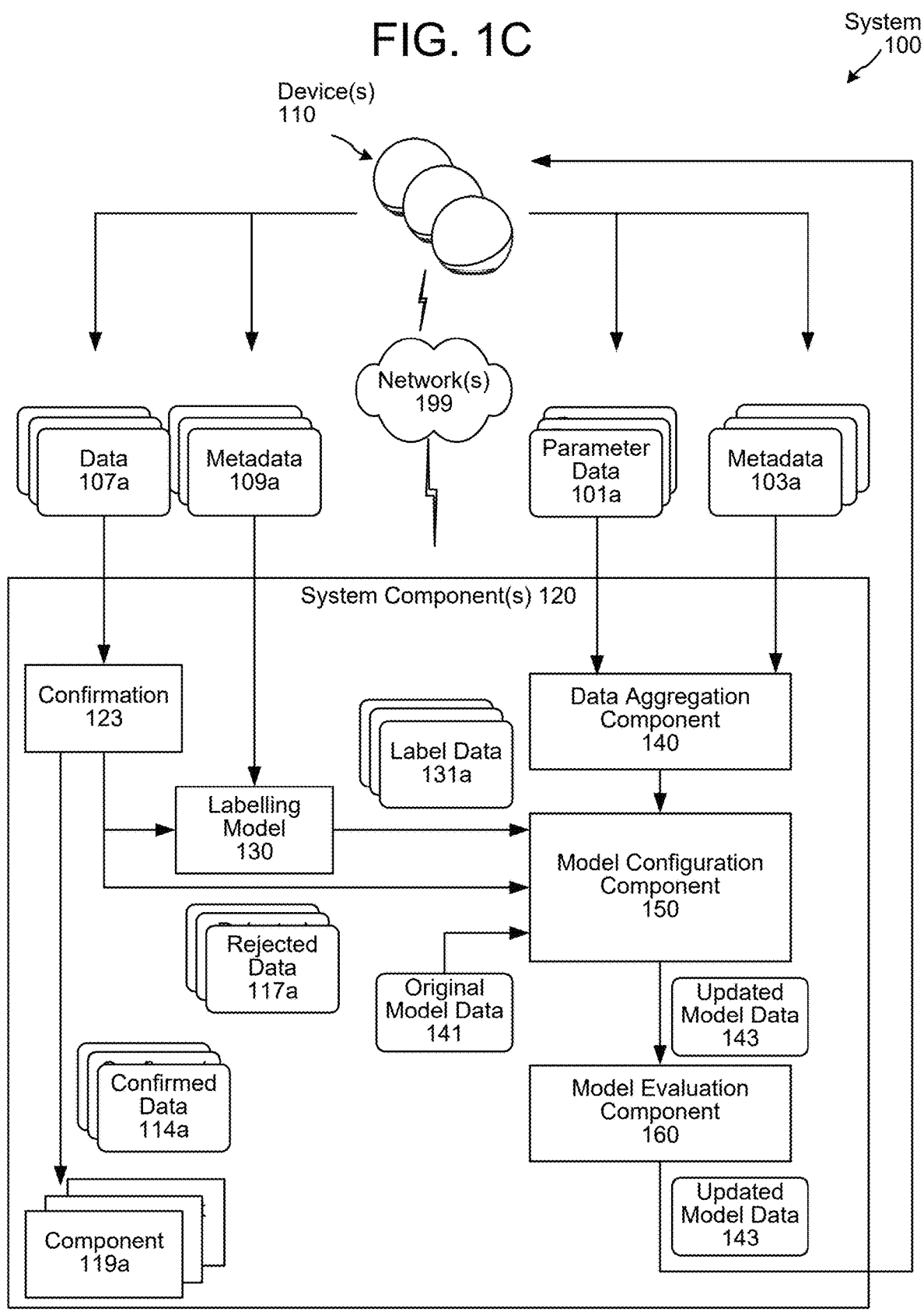
FIG. 1C is a conceptual diagram illustrating a system 100 for data processing and model retraining, according to embodiments of the present disclosure.

FIG. 1C illustrates the system 100 configured to update a model that may operate on an unspecified type(s) of data. The operations/components illustrated in FIG. 1C may be similar to those discussed herein for other figures. As shown, device(s) 110 can process data 107 using a model and, if the device(s) 110 determine such data 107 is suitable to be sent to system component(s) 120 (for example as a result of operation of the model), may send data 107 and corresponding metadata 109 to the system component(s) 120. The device(s) 110 may also sent to the system component(s) 120 parameter data 101 and corresponding metadata 103 where the parameter data results from adjustments made by the device(s) to parameter(s) of the model as described herein. The system component(s) 120 as shown in FIG. 1C may operate in a similar manner to other figures discussed herein (e.g., FIG. 1B, etc.) and may operate a confirmation component 123 which may operate a more powerful version of the model operated by device(s) 110. If data processed by the confirmation component 123 (which is analogous to WW confirmation component 122) is confirmed (e.g., the confirmation component 123 determines the data 107 was correctly processed by a device 110), the confirmed data 114 may be sent to one or more downstream component(s) 119 for operation, where the destination component(s) 119 may depend on the intended purposes of the data 114. If data processed by the confirmation component 123 is rejected (e.g., the confirmation component 123 determines the data 107 was incorrectly processed by a device 110), the rejected data 117 may be sent to a labelling model 130/model configuration component 150 for processing as described herein to be used (along with metadata 109, parameter data 101, and/or metadata 103) to determine updated model data 143.

Figure 4:
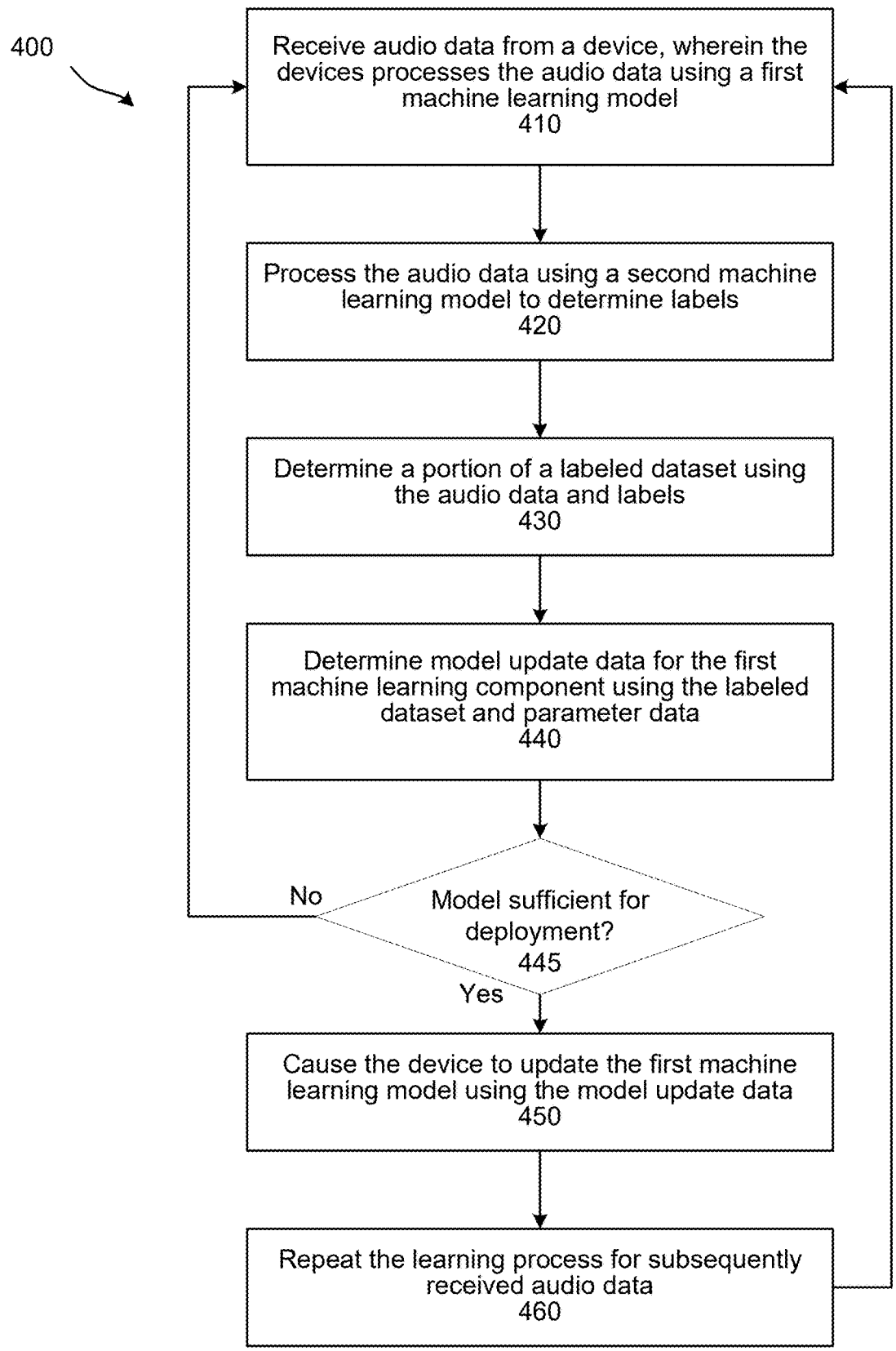
FIG. 4 is a process flow diagram illustrating how a system may update a machine learning model in an unsupervised manner according to embodiments of the present disclosure.

FIG. 4 is a flowchart illustrating an example method 400 of self-supervised learning for audio processing models, according to embodiments of the present disclosure. The method 400 may be performed using, for example, components of the system 100. The method 400 may include receiving (410) audio data from a device 110, wherein the devices processes the audio data using a first machine learning model. The device 110 may be, for example, a voice-controlled device 110 as described herein. The machine learning model may be (or operate) a machine learning model such as a neural network. In some implementations, the model may be part of the wakeword detection component 520; however, other types of models may be used.

The method 400 may include processing (420) the audio data using a second machine learning model to determine label data 131. The second machine learning model may be, for example, the labelling model 130. The second machine learning model may operate a machine learning model that process a same type of data as the first machine learning model to produce a same type of output; for example, processing audio data to detect a wakeword, identify a user (as in user recognition component 595), determine a sentiment (as with sentiment detection component 575), identify an acoustic event (as with AED 573), determine if speech is system directed (as with SDD 585), etc. The second machine learning model may, however, be a larger and/or more powerful or accurate model than the on-device first machine learning model. The labels determined by the second machine learning model may be used as part of a self-supervised learning process to train and update the first machine learning model.

The method 400 may include determining (430) a portion of a labeled dataset using the audio data and labels. The system 100 may join the audio data and the labels to create a portion of a labeled dataset. In some implementations, audio data and labels corresponding to an utterance may be selected for the labeled dataset or discarded based on various characteristics and signals. For example, an utterance may be included in a dataset based on one or more characteristics. The labeled dataset may then be compiled using utterances representing one, a subset, or all devices 110 in the system 100 and/or based on the utterance selection criteria.

The method 400 may include determining (440) model update data for the first machine learning model using the labeled dataset and parameter data from other device operations; for example, that represents the first machine learning model operating on the first device 110. Once the labeled dataset has been compiled, the system 100 may retrieve original model data 141 that corresponds to the first machine learning model. The model configuration component 150 may calculate gradient data from the audio frames and labels by, for example, performing a forward pass and then back-propagation on the model. The gradient data may be compiled from multiple utterances, devices, and/or training rounds to generate the updated model data 143. The system may thus determine (445) if an updated model is sufficient for deployment. For example, in some cases, the updated model data 143 may be validated or otherwise evaluated by model evaluation component 160 prior to pushing to the device 110. An incremental model evaluator may evaluate the updated model using, for example, a historical dataset, to ensure that model iterations improve operation (e.g., exhibit an improved performance metric). In some cases, the model configuration component 150 may generate multiple candidate model updates, which the model evaluation component 160 may evaluate to select a best performing model update.

Thus, in some implementations, the system 100 may make multiple incremental updates to the model prior to publishing an update. If the model is not sufficient for deployment (445: No), for example as determined by model evaluation component 160, the method 400 may return to a stage 410 and collect additional audio data, process it to generate labels, calculate new gradients, and evaluate a subsequent model update. The method 400 may repeat this cycle a number of times until a predetermined number of iterations have occurred, a predetermined amount of time has elapsed, and/or a predetermined increase in a performance has been achieved. If the model is sufficient for deployment, (445: Yes), for example as determined by model evaluation component 160, the method 400 may proceed to a stage to publish a model release (e.g., step 190 of FIG. 1A) to update the first machine learning model.

Thus, to publish a model release I method 400 may include causing (450) the device to update the first machine learning model using the model update data. Once a model update has been validated, the system 100 can send updated model data 143 to the device(s) 110. For example, the updated model data 143 may include updated model parameters (e.g., NN model weights) for the first machine learning model, or information for modifying the parameters. The device(s) 110 may, upon receiving the updated model data 143, update local models using updated parameters, weights, gradients, and/or other data contained in the updated model data 143. The system 100 may store updated model data 143 in model storage to be used for calculating gradient data for subsequently received and labeled audio data.

The method 400 may include repeating (460) the learning process using subsequently received audio data. Once a model update has been completed, the system may continue to collect and process audio data to further refine the machine learning models. The method 400 may thus return to the stage 410 and repeat the process.

The above approaches may be used to update entire models, selected one or more parameters of a model, or the like. Example parameters may include gradients, model weights, thresholds, or other operating parameter(s) of a trained model. As can be appreciated, the above operations may be performed at multiple times for different parameters, different models, different cohorts/devices, etc. depending on system configuration. The above approaches may also be used for different models that may be used by different components for different purposes, depending on system configuration, desired model personalization, etc.

For example, the teachings herein may be used to update a model/parameter(s) to be used for wakeword detection, for example using WW detection component 520. The teachings herein may also be used to update a model/parameter(s) to be used for user recognition, for example using user recognition component 595. The teachings herein may also be used to update a model/parameter(s) to be used for sentiment detection, for example using sentiment detection component 575. The teachings herein may also be used to update a model/parameter(s) to be used for detecting whether an input is system directed, for example using SDD 575. The teachings herein may also be used to update a model/parameter(s) to be used for AED detection, for example using AED component 573. The teachings herein may also be used to update a model/parameter(s) to be used for image processing. The teachings herein may also be used to update a model/parameter(s) to be used for ASR processing, for example using ASR component 550 (for example acoustic modeling, language modeling, etc.). The teachings herein may also be used to update a model/parameter(s) to be used for NLU processing, for example using NLU component 560 (for example named entity recognition, intent classification, text tagging, etc.). The teachings herein may also be used to update a model/parameter(s) to be used for natural language generation, for example using NLG component 579. The teachings herein may also be used to update a model/parameter(s) to be used for speech synthesis, for example using TTS component 580. Many other model types/components may benefit from the model updating techniques discussed herein.

The above operations may be performed in an unsupervised manner, thus allowing retraining of an ML model using the gradient data, audio data, etc. without human intervention.

Figure 5:
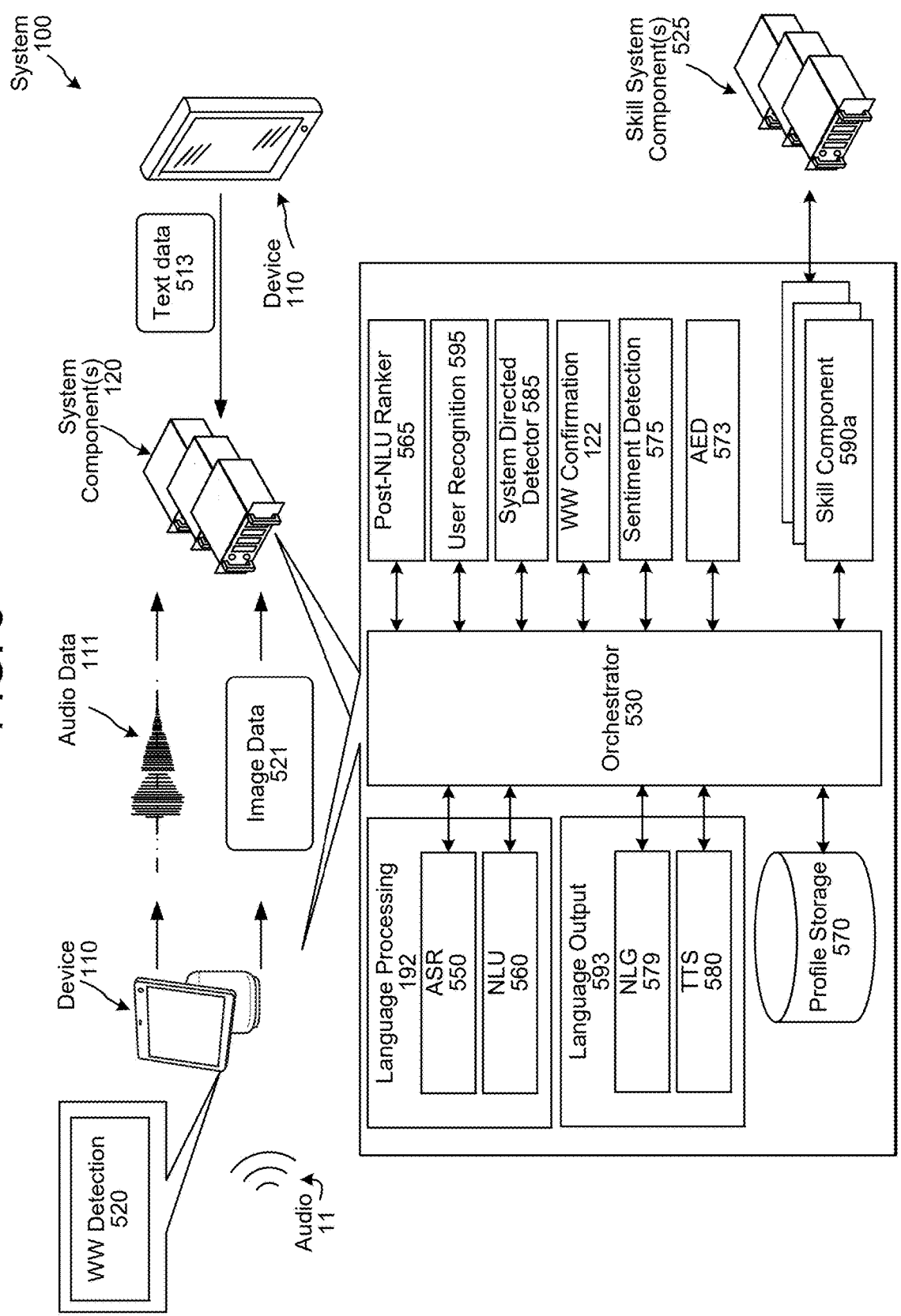
FIG. 5 is a conceptual diagram of components of the system, according to embodiments of the present disclosure.

The system 100 may operate using various components as described in FIG. 5. The various components may be located on same or different physical devices. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system component(s). In at least some embodiments, such determination may be made using a wakeword detection component 520. The wakeword detection component 520 may be configured to detect various wakewords. In at least some examples, each wakeword may correspond to a name of a different digital assistant. An example wakeword/digital assistant name is "Alexa." In another example, input to the system may be in form of text data 513, for example as a result of a user typing an input into a user interface of device 110. Other input forms may include indication that the user has pressed a physical or virtual button on device 110, the user has made a gesture, etc. The device 110 may also capture images using camera(s) 1018 of the device 110 and may send image data 521 representing those image(s) to the system component(s). The image data 521 may include raw image data or image data processed by the device 110 before sending to the system component(s). The image data 521 may be used in various manners by different components of the system to perform operations such as determining whether a user is directing an utterance to the system, interpreting a user command, responding to a user command, etc.

The wakeword detector 520 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 520 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 520 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 520 and/or input is detected by an input detector, the device 110 may "wake" and begin transmitting audio data 111, representing the audio 11, to the system component(s) 120. The audio data 111 may include data corresponding to the wakeword; in other embodiments, the portion of the audio corresponding to the wakeword is removed by the device 110 prior to sending the audio data 111 to the system component(s) 120. In the case of touch input detection or gesture based input detection, the audio data may not include a wakeword. As used herein, the term audio data may include raw audio data, such as that output by a microphone, or may include data such as that output by an acoustic front end (AFE) or other component. In certain configurations, audio data may include a feature vector representing audio features/characteristics, where the audio data may be processed by a machine learning model (such as a wakeword detection model, ASR model, user recognition model, sentiment detection model, etc.) to determine some model output data.

In some implementations, the system 100 may include more than one system component(s). The system component(s) 120 may respond to different wakewords and/or perform different categories of tasks. Each system component(s) may be associated with its own wakeword such that speaking a certain wakeword results in audio data being sent to and processed by a particular system. For example, detection of the wakeword "Alexa" by the wakeword detector 520 may result in sending audio data to system component(s) a for processing while detection of the wakeword "Computer" by the wakeword detector may result in sending audio data to system component(s) b for processing. The system may have a separate wakeword and system for different skills/systems (e.g., "Dungeon Master" for a game play skill/system component(s) c) and/or such skills/systems may be coordinated by one or more skill(s) 590 of one or more system component(s) 120.

The device 110 may also include a system directed input detector 585. (The system component(s) may also include a system directed input detector 585 which may operate in a manner similar to system directed input detector 585.) The system directed input detector 585 may be configured to determine whether an input to the system (for example speech, a gesture, etc.) is directed to the system or not directed to the system (for example directed to another user, etc.). The system directed input detector 585 may work in conjunction with the wakeword detector 520. If the system directed input detector 585 determines an input is directed to the system, the device 110 may "wake" and begin sending captured data for further processing (for example, processing audio data using the language processing 192, processing captured image data). If data is being processed the device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 585 determines an input is not directed to the system (such as a speech or gesture directed to another user) the device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 585 is determining whether an input is potentially device directed. For example, the system may output an orange indicator while considering an input, and may output a green indicator if a system directed input is detected. Other such configurations are possible. Further details regarding the system directed input detector 585 are included below with regard to FIG. 6.

Upon receipt by the system component(s) 120, the audio data 111 may be sent to an orchestrator component 530. The orchestrator component 530 may include memory and logic that enables the orchestrator component 530 to transmit various pieces and forms of data to various components of the system, as well as perform other operations as described herein.

The orchestrator component 530 may send the audio data 111 to a language processing component 192. The language processing component 192 (sometimes also referred to as a spoken language understanding (SLU) component) includes an automatic speech recognition (ASR) component 550 and a natural language understanding (NLU) component 560. The ASR component 550 may transcribe the audio data 111 into text data. The text data output by the ASR component 550 represents one or more than one (e.g., in the form of an N-best list) ASR hypotheses representing speech represented in the audio data 111. The ASR component 550 interprets the speech in the audio data 111 based on a similarity between the audio data 111 and pre-established language models. For example, the ASR component 550 may compare the audio data 111 with models for sounds (e.g., acoustic units such as phonemes, senons, phones, etc.) and sequences of sounds to identify words that match the sequence of sounds of the speech represented in the audio data 111. The ASR component 550 sends the text data generated thereby to an NLU component 560, via, in some embodiments, the orchestrator component 530. The text data sent from the ASR component 550 to the NLU component 560 may include a single top-scoring ASR hypothesis or may include an N-best list including multiple top-scoring ASR hypotheses. An N-best list may additionally include a respective score associated with each ASR hypothesis represented therein. The ASR component 550 is described in greater detail below with regard to FIG. 7.

The speech processing system 192 may further include a NLU component 560. The NLU component 560 may receive the text data from the ASR component. The NLU component 560 may attempts to make a semantic interpretation of the phrase(s) or statement(s) represented in the text data input therein by determining one or more meanings associated with the phrase(s) or statement(s) represented in the text data. The NLU component 560 may determine an intent representing an action that a user desires be performed and may determine information that allows a device (e.g., the device 110, the system component(s) 120, a skill component 590, a skill system component(s) 525, etc.) to execute the intent. For example, if the text data corresponds to "play the $5^{th}$ Symphony by Beethoven," the NLU component 560 may determine an intent that the system output music and may identify "Beethoven" as an artist/composer and "5th Symphony" as the piece of music to be played. For further example, if the text data corresponds to "what is the weather," the NLU component 560 may determine an intent that the system output weather information associated with a geographic location of the device 110. In another example, if the text data corresponds to "turn off the lights," the NLU component 560 may determine an intent that the system turn off lights associated with the device 110 or the user 5. However, if the NLU component 560 is unable to resolve the entity—for example, because the entity is referred to by anaphora such as "this song" or "my next appointment"—the speech processing system 192 can send a decode request to another speech processing system 192 for information regarding the entity mention and/or other context related to the utterance. The speech processing system 192 may augment, correct, or base results data upon the audio data 111 as well as any data received from the other speech processing system 192.

The NLU component 560 may return NLU results data 985/925 (which may include tagged text data, indicators of intent, etc.) back to the orchestrator 530. The orchestrator 530 may forward the NLU results data to a skill component(s) 590. If the NLU results data includes a single NLU hypothesis, the NLU component 560 and the orchestrator component 530 may direct the NLU results data to the skill component(s) 590 associated with the NLU hypothesis. If the NLU results data 985/925 includes an N-best list of NLU hypotheses, the NLU component 560 and the orchestrator component 530 may direct the top scoring NLU hypothesis to a skill component(s) 590 associated with the top scoring NLU hypothesis. The system may also include a post-NLU ranker 565 which may incorporate other information to rank potential interpretations determined by the NLU component 560. The NLU component 560, post-NLU ranker 565 and other components are described in greater detail below with regard to FIGS. 8 and 9.

A skill component may be software running on the system component(s) 120 that is akin to a software application. That is, a skill component 590 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 590. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 590 may operate in conjunction between the system component(s) 120 and other devices, such as the device 110, in order to complete certain functions. Inputs to a skill component 590 may come from speech processing interactions or through other interactions or input sources. A skill component 590 may include hardware, software, firmware, or the like that may be dedicated to a particular skill component 590 or shared among different skill components 590.

A skill system component(s) 525 may communicate with a skill component(s) 590 within the system component(s) 120 and/or directly with the orchestrator component 530 or with other components. A skill system component(s) 525 may be configured to perform one or more actions. An ability to perform such action(s) may sometimes be referred to as a "skill." That is, a skill may enable a skill system component(s) 525 to execute specific functionality in order to provide data or perform some other action requested by a user. For example, a weather service skill may enable a skill system component(s) 525 to provide weather information to the system component(s) 120, a car service skill may enable a skill system component(s) 525 to book a trip with respect to a taxi or ride sharing service, an order pizza skill may enable a skill system component(s) 525 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The system component(s) 120 may be configured with a skill component 590 dedicated to interacting with the skill system component(s) 525. Unless expressly stated otherwise, reference to a skill, skill device, or skill component may include a skill component 590 operated by the system component(s) 120 and/or skill operated by the skill system component(s) 525. Moreover, the functionality described herein as a skill or skill may be referred to using many different terms, such as an action, bot, app, or the like. The skill 590 and or skill system component(s) 525 may return output data to the orchestrator 530.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system(s) 100 may include a dialog manager component (not shown) that manages and/or tracks a dialog between a user and a device. As used herein, a "dialog" may refer to multiple related user inputs and system 100 outputs (e.g., through device(s) 110) between the system and the user that may have originated with a single user input initiating the dialog. Thus, the data associated with a dialog may be associated with a same dialog identifier, which may be used by components of the overall system 100 to associate information across the dialog. Subsequent user inputs of the same dialog may or may not start with the user speaking a wakeword. Each natural language input may be associated with a different natural language input identifier, and each natural language input identifier may be associated with a corresponding dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The system component(s) includes a language output component 593. The language output component 593 includes a natural language generation (NLG) component 579 and a text-to-speech (TTS) component 580. The NLG component 579 can generate text for purposes of TTS output to a user. For example the NLG component 579 may generate text corresponding to instructions corresponding to a particular action for the user to perform. The NLG component 579 may generate appropriate text for various outputs as described herein. The NLG component 579 may include one or more trained models configured to output text appropriate for a particular input. The text output by the NLG component 579 may become input for the TTS component 580. Alternatively or in addition, the TTS component 580 may receive text data from a skill 590 or other system component for output.

The NLG component 579 may include a trained model. The NLG component 579 generates text data from dialog data received by a dialog manager such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 580.

The TTS component 580 may generate audio data (e.g., synthesized speech) from text data using one or more different methods. Text data input to the TTS component 580 may come from a skill component 590, the orchestrator component 530, or another component of the system. In one method of synthesis called unit selection, the TTS component 580 matches text data against a database of recorded speech. The TTS component 580 selects matching units of recorded speech and concatenates the units together to form audio data. In another method of synthesis called parametric synthesis, the TTS component 580 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the system component(s) 120 as image data. The device 110 may further include circuitry for voice command-based control of the camera, allowing a user 5 to request capture of image or video data. The device 110 may process the commands locally or send audio data 111 representing the commands to the system component(s) 120 for processing, after which the system component(s) 120 may return output data that can cause the device 110 to engage its camera.

Upon receipt by the system component(s) 120, the image data 521 may be sent to an orchestrator component 530. The orchestrator component 530 may send the image data 521 to an image processing component (not shown). The image processing component can perform computer vision functions such as object recognition, modeling, reconstruction, etc. For example, the image processing component may detect a person, face, etc. (which may then be identified using user recognition component 595).

The system component(s) 120 may include a user recognition component 595 that recognizes one or more users using a variety of data.

The user-recognition component 595 may take as input the audio data 111 and/or text data output by the ASR component 550. The user-recognition component 595 may perform user recognition by comparing audio characteristics in the audio data 111 to stored audio characteristics of users. The user-recognition component 595 may also perform user recognition by comparing biometric data (e.g., fingerprint data, iris data, etc.), received by the system in correlation with the present user input, to stored biometric data of users assuming user permission and previous authorization. The user-recognition component 595 may further perform user recognition by comparing image data (e.g., including a representation of at least a feature of a user), received by the system in correlation with the present user input, with stored image data including representations of features of different users. The user-recognition component 595 may perform additional user recognition processes, including those known in the art.

The user-recognition component 595 determines scores indicating whether user input originated from a particular user. For example, a first score may indicate a likelihood that the user input originated from a first user, a second score may indicate a likelihood that the user input originated from a second user, etc. The user-recognition component 595 also determines an overall confidence regarding the accuracy of user recognition operations.

Output of the user-recognition component 595 may include a single user identifier corresponding to the most likely user that originated the user input. Alternatively, output of the user-recognition component 595 may include an N-best list of user identifiers with respective scores indicating likelihoods of respective users originating the user input. The output of the user-recognition component 595 may be used to inform NLU processing as well as processing performed by other components of the system.

The system 100 (either on device 110, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 570 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 570 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 570 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system component(s) 120 may also include a sentiment detection component 575 that may be configured to detect a sentiment of a user from audio data representing speech/utterances from the user, image data representing an image of the user, and/or the like. The sentiment detection component 575 may be included in system component(s) 120, as illustrated in FIG. 5, although the disclosure is not limited thereto and the sentiment detection component 575 may be included in other components without departing from the disclosure. For example, the sentiment detection component 575 may be included in the device 110, as a separate component, etc. The system component(s) 120 may use the sentiment detection component 575 to, for example, customize a response for a user based on an indication that the user is happy or frustrated.

Acoustic event detection (AED) is a field of computer science and artificial intelligence that relates to processing audio data representing a sound, such as a non-speech sound, to determine when and if a particular acoustic event is represented in the audio data. Examples of such events may include glass breaking, a baby crying, or other events. A system capable of performing speech processing may also be capable of performing AED.

A device and/or a system may thus be configured to process audio data to determine if properties of the audio data correspond to properties associated with an acoustic event. Examples of acoustic events include a doorbell ringing, a microwave oven beeping, a dog barking, a window pane (or other glass) breaking, and/or a door closing. The device and/or components of the larger system may process the audio data in groups of samples (e.g., time-based, frequency-based, or other portions of audio data), known as frames of audio data, to extract audio features from the audio data as it is received. The audio features may include, for example, log Mel-filterbank energy features corresponding to the audio data frames. An acoustic event detection (AED) component may process the audio features. The same audio feature data processed by a wakeword detection component (e.g., 520 and/or 122) may be used by an AED component, such as AED component 573, which may reside on the device 110 and/or on the system component(s) 120.

Although the components of FIG. 5 may be illustrated as part of system component(s) 120, device 110, or otherwise, the components may be arranged in other device(s) (such as in device 110 if illustrated in system component(s) 120 or vice-versa, or in other device(s) altogether) without departing from the disclosure.

Figure 6:
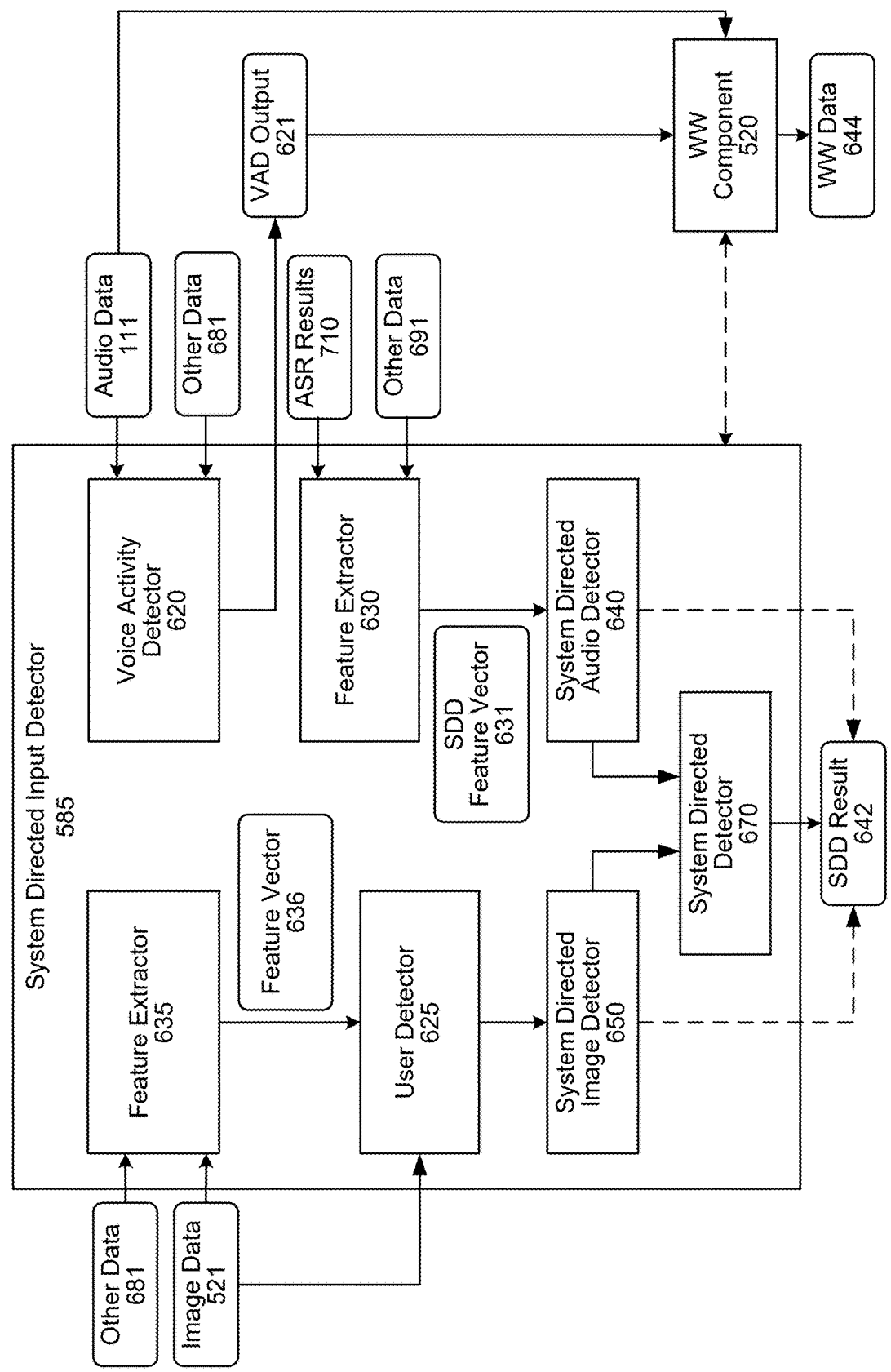
FIG. 6 is a conceptual diagram of components of a system to detect if input audio data includes system directed speech, according to embodiments of the present disclosure.

Configuration and operation of the system directed input detector 585 is illustrated in FIG. 6. As shown in FIG. 6, the system directed input detector 585 may include a number of different components. First, the system directed input detector 585 may include a voice activity detector (VAD) 620. The VAD 620 may operate to detect whether the incoming audio data 111 includes speech or not. The VAD output 621 may be a binary indicator. Thus, if the incoming audio data 111 includes speech, the VAD 620 may output an indicator 621 that the audio data 111 does includes speech (e.g., a 1) and if the incoming audio data 111 does not includes speech, the VAD 620 may output an indicator 621 that the audio data 111 does not includes speech (e.g., a 0). The VAD output 621 may also be a score (e.g., a number between 0 and 1) corresponding to a likelihood that the audio data 111 includes speech. The VAD 620 may also perform start-point detection as well as end-point detection where the VAD 620 determines when speech starts in the audio data 111 and when it ends in the audio data 111. Thus the VAD output 621 may also include indicators of a speech start point and/or a speech endpoint for use by other components of the system. (For example, the start-point and end-points may demarcate the audio data 111 that is sent to the speech processing component 240.) The VAD output 621 may be associated with a same unique ID as the audio data 111 for purposes of tracking system processing across various components.

The VAD 620 may operate using a variety of VAD techniques, including those described above with regard to VAD operations performed by device 110. The VAD may be configured to be robust to background noise so as to accurately detect when audio data actually includes speech or not. The VAD 620 may operate on raw audio data 111 such as that sent by device 110 or may operate on feature vectors or other data representing the audio data 111. For example, the VAD 620 may take the form of a deep neural network (DNN) and may operate on a single feature vector representing the entirety of audio data 111 received from the device or may operate on multiple feature vectors, for example feature vectors representing frames of audio data where each frame covers a certain amount of time of audio data (e.g., 25 ms). The VAD 620 may also operate on other data 681 that may be useful in detecting voice activity in the audio data 111. For example, the other data 681 may include results of anchored speech detection where the system takes a representation (such as a voice fingerprint, reference feature vector, etc.) of a reference section of speech (such as speech of a voice that uttered a previous command to the system that included a wakeword) and compares a voice detected in the audio data 111 to determine if that voice matches a voice in the reference section of speech. If the voices match, that may be an indicator to the VAD 620 that speech was detected. If not, that may be an indicator to the VAD 620 that speech was not detected. (For example, a representation may be taken of voice data in the first input audio data which may then be compared to the second input audio data to see if the voices match. If they do (or do not) that information may be considered by the VAD 620.) The VAD 620 may also consider other data when determining if speech was detected. The VAD 620 may also consider speaker ID information (such as may be output by user recognition component 595), directionality data that may indicate what direction (relative to the capture device 110) the incoming audio was received from. Such directionality data may be received from the device 110 and may have been determined by a beamformer or other component of device 110. The VAD 620 may also consider data regarding a previous utterance which may indicate whether the further audio data received by the system is likely to include speech. Other VAD techniques may also be used.

If the VAD output 621 indicates that no speech was detected the system (through orchestrator 530 or some other component) may discontinue processing with regard to the audio data 111, thus saving computing resources that might otherwise have been spent on other processes (e.g., ASR for the audio data 111, etc.). If the VAD output 621 indicates that speech was detected, the system may make a determination as to whether the speech was or was not directed to the speech-processing system. Such a determination may be made by the system directed audio detector 640. The system directed audio detector 640 may include a trained model, such as a DNN, that operates on a feature vector which represent certain data that may be useful in determining whether or not speech is directed to the system. To create the feature vector operable by the system directed audio detector 640, a feature extractor 630 may be used. The feature extractor 630 may input ASR results 710 which include results from the processing of the audio data 111 by the speech recognition component 550. For privacy protection purposes, in certain configurations the ASR results 710 may be obtained from a language processing component 192/ASR component 550 located on device 110 or on a home remote component as opposed to a language processing component 192/ASR component 550 located on a cloud or other remote system component(s) so that audio data 111 is not sent remote from the user's home unless the system directed input detector component 585 has determined that the input is system directed. Though this may be adjusted depending on user preferences/system configuration.

The ASR results 710 may include an N-best list of top scoring ASR hypotheses and their corresponding scores, portions (or all of) an ASR lattice/trellis with scores, portions (or all of) an ASR search graph with scores, portions (or all of) an ASR confusion network with scores, or other such ASR output. As an example, the ASR results 710 may include a trellis, which may include a raw search graph as scored during ASR decoding. The ASR results 710 may also include a lattice, which may be a trellis as scored that has been pruned to remove certain hypotheses that do not exceed a score threshold or number of hypotheses threshold. The ASR results 710 may also include a confusion network where paths from the lattice have been merged (e.g., merging hypotheses that may share all or a portion of a same word). The confusion network may be a data structure corresponding to a linear graph that may be used as an alternate representation of the most likely hypotheses of the decoder lattice. The ASR results 710 may also include corresponding respective scores (such as for a trellis, lattice, confusion network, individual hypothesis, N-best list, etc.)

The ASR results 710 (or other data 691) may include other ASR result related data such as other features from the ASR system or data determined by another component. For example, the system may determine an entropy of the ASR results (for example a trellis entropy or the like) that indicates a how spread apart the probability mass of the trellis is among the alternate hypotheses. A large entropy (e.g., large spread of probability mass over many hypotheses) may indicate the ASR component 550 being less confident about its best hypothesis, which in turn may correlate to detected speech not being device directed. The entropy may be a feature included in other data 691 to be considered by the system directed audio detector 640.

The system may also determine and consider ASR decoding costs, which may include features from Viterbi decoding costs of the ASR. Such features may indicate how well the input acoustics and vocabulary match with the acoustic models 753 and language models 754. Higher Viterbi costs may indicate greater mismatch between the model and the given data, which may correlate to detected speech not being device directed. Confusion network feature may also be used. For example, an average number of arcs (where each arc represents a word) from a particular node (representing a potential join between two words) may measure how many competing hypotheses there are in the confusion network. A large number of competing hypotheses may indicate that the ASR component 550 is less confident about the top hypothesis, which may correlate to detected speech not being device directed. Other such features or data from the ASR results 710 may also be used as other data 691.

The ASR results 710 may be represented in a system directed detector (SDD) feature vector 631 that can be used to determine whether speech was system-directed. The feature vector 631 may represent the ASR results 710 but may also represent audio data 111 (which may be input to feature extractor 630) or other information. Such ASR results may be helpful in determining if speech was system-directed. For example, if ASR results include a high scoring single hypothesis, that may indicate that the speech represented in the audio data 111 is directed at, and intended for, the device 110. If, however, ASR results do not include a single high scoring hypothesis, but rather many lower scoring hypotheses, that may indicate some confusion on the part of the speech recognition component 550 and may also indicate that the speech represented in the audio data 111 was not directed at, nor intended for, the device 110.

The ASR results 710 may include complete ASR results, for example ASR results corresponding to all speech between a startpoint and endpoint (such as a complete lattice, etc.). In this configuration the system may wait until all ASR processing for a certain input audio has been completed before operating the feature extractor 630 and system directed audio detector 640. Thus the system directed audio detector 640 may receive a feature vector 631 that includes all the representations of the audio data 111 created by the feature extractor 630. The system directed audio detector 640 may then operate a trained model (such as a DNN) on the feature vector 631 to determine a score corresponding to a likelihood that the audio data 111 includes a representation of system-directed speech. If the score is above a threshold, the system directed audio detector 640 may determine that the audio data 111 does include a representation of system-directed speech. The SDD result 642 may include an indicator of whether the audio data includes system-directed speech, a score, and/or some other data.

The ASR results 710 may also include incomplete ASR results, for example ASR results corresponding to only some speech between a between a startpoint and endpoint (such as an incomplete lattice, etc.). In this configuration the feature extractor 630/system directed audio detector 640 may be configured to operate on incomplete ASR results 710 and thus the system directed audio detector 640 may be configured to output an SSD result 642 that provides an indication as to whether the portion of audio data processed (that corresponds to the incomplete ASR results) corresponds to system directed speech. The system may thus be configured to perform ASR at least partially in parallel with the system directed audio detector 640 to process ASR result data as it is ready and thus continually update an SDD result 642. Once the system directed input detector 585 has processed enough ASR results and/or the SDD result 642 exceeds a threshold, the system may determine that the audio data 111 includes system-directed speech. Similarly, once the system directed input detector 585 has processed enough ASR results and/or the SDD result 642 drops below another threshold, the system may determine that the audio data 111 does not include system-directed speech.

The SDD result 642 may be associated with a same unique ID as the audio data 111 and VAD output 621 for purposes of tracking system processing across various components.

The feature extractor 630 may also incorporate in a feature vector 631 representations of other data 691. Other data 691 may include, for example, word embeddings from words output by the speech recognition component 550 may be considered. Word embeddings are vector representations of words or sequences of words that show how specific words may be used relative to other words, such as in a large text corpus. A word embedding may be of a different length depending on how many words are in a text segment represented by the word embedding. For purposes of the feature extractor 630 processing and representing a word embedding in a feature vector 631 (which may be of a fixed length), a word embedding of unknown length may be processed by a neural network with memory, such as an LSTM (long short term memory) network. Each vector of a word embedding may be processed by the LSTM which may then output a fixed representation of the input word embedding vectors.

Other data 691 may also include, for example, NLU output from the natural language 560 component may be considered. Thus, if natural language output data 985/925 indicates a high correlation between the audio data 111 and an out-of-domain indication (e.g., no intent classifier scores from ICs 864 or overall domain scores from recognizers 863 reach a certain confidence threshold), this may indicate that the audio data 111 does not include system-directed speech. Other data 691 may also include, for example, an indicator of a user/speaker as output user recognition component 595. Thus, for example, if the user recognition component 595 does not indicate the presence of a known user, or indicates the presence of a user associated with audio data 111 that was not associated with a previous utterance, this may indicate that the audio data 111 does not include system-directed speech. The other data 691 may also include an indication that a voice represented in audio data 111 is the same (or different) as the voice detected in previous input audio data corresponding to a previous utterance. The other data 691 may also include directionality data, for example using beamforming or other audio processing techniques to determine a direction/location of a source of detected speech and whether that source direction/location matches a speaking user. The other data 691 may also include data indicating that a direction of a user's speech is toward a device 110 or away from a device 110, which may indicate whether the speech was system directed or not.

Other data 691 may also include image data 521. For example, if image data is detected from one or more devices that are nearby to the device 110 (which may include the device 110 itself) that captured the audio data being processed using the system directed input detector (585), the image data may be processed to determine whether a user is facing an audio capture device for purposes of determining whether speech is system-directed as further explained below.

Other data 691 may also dialog history data. For example, the other data 691 may include information about whether a speaker has changed from a previous utterance to the current audio data 111, whether a topic of conversation has changed from a previous utterance to the current audio data, how NLU results from a previous utterance compare to NLU results obtained using the current audio data 111, other system context information. The other data 691 may also include an indicator as to whether the audio data 111 was received as a result of a wake command or whether the audio data 111 was sent without the device 110 detecting a wake command (e.g., the device 110 being instructed by system component(s) and/or determining to send the audio data without first detecting a wake command).

Other data 691 may also include information from the user profile 570.

Other data 691 may also include direction data, for example data regarding a direction of arrival of speech detected by the device, for example a beam index number, angle data, or the like. If second audio data is received from a different direction than first audio data, then the system may be less likely to declare the second audio data to include system-directed speech since it is originating from a different location.

Other data 691 may also include acoustic feature data such as pitch, prosody, intonation, volume, or other data descriptive of the speech in the audio data 111. As a user may use a different vocal tone to speak with a machine than with another human, acoustic feature information may be useful in determining if speech is device-directed.

Other data 691 may also include an indicator that indicates whether the audio data 111 includes a wakeword. For example, if a device 110 detects a wakeword prior to sending the audio data 111 to the system component(s) 120, the device 110 may send along an indicator that the device 110 detected a wakeword in the audio data 111. In another example, the system component(s) 120 may include another component that processes incoming audio data 111 to determine if it includes a wakeword. If it does, the component may create an indicator indicating that the audio data 111 includes a wakeword. The indicator may then be included in other data 691 to be incorporated in the feature vector 631 and/or otherwise considered by the system directed audio detector 640.

Other data 691 may also include device history data such as information about previous operations related to the device 110 that sent the audio data 111. For example, the other data 691 may include information about a previous utterance that was just executed, where the utterance originated with the same device 110 as a current utterance and the previous utterance was within a certain time window of the current utterance. Device history data may be stored in a manner associated with the device identifier (which may also be included in other data 691), which may also be used to track other information about the device, such as device hardware, capability, location, etc.

The other data 681 used by the VAD 620 may include similar data and/or different data from the other data 691 used by the feature extractor 630. The other data 681/691 may thus include a variety of data corresponding to input audio from a previous utterance. That data may include acoustic data from a previous utterance, speaker ID/voice identification data from a previous utterance, information about the time between a previous utterance and a current utterance, or a variety of other data described herein taken from a previous utterance. A score threshold (for the system directed audio detector 640 and/or the VAD 620) may be based on the data from the previous utterance. For example, a score threshold (for the system directed audio detector 640 and/or the VAD 620) may be based on acoustic data from a previous utterance.

The feature extractor 630 may output a single feature vector 631 for one utterance/instance of input audio data 111. The feature vector 631 may consistently be a fixed length, or may be a variable length vector depending on the relevant data available for particular audio data 111. Thus, the system directed audio detector 640 may output a single SDD result 642 per utterance/instance of input audio data 111. The SDD result 642 may be a binary indicator. Thus, if the incoming audio data 111 includes system-directed speech, the system directed audio detector 640 may output an indicator 642 that the audio data 111 does includes system-directed speech (e.g., a 1) and if the incoming audio data 111 does not includes system-directed speech, the system directed audio detector 640 may output an indicator 642 that the audio data 111 does not system-directed includes speech (e.g., a 0). The SDD result 642 may also be a score (e.g., a number between 0 and 1) corresponding to a likelihood that the audio data 111 includes system-directed speech. Although not illustrated in FIG. 6, the flow of data to and from the system directed input detector 585 may be managed by the orchestrator 530 or by one or more other components.

The trained model(s) of the system directed audio detector 640 may be trained on many different examples of SDD feature vectors that include both positive and negative training samples (e.g., samples that both represent system-directed speech and non-system directed speech) so that the DNN and/or other trained model of the system directed audio detector 640 may be capable of robustly detecting when speech is system-directed versus when speech is not system-directed.

A further input to the system directed input detector 585 may include output data from TTS component 580 to avoid synthesized speech output by the system being confused as system-directed speech spoken by a user. The output from the TTS component 580 may allow the system to ignore synthesized speech in its considerations of whether speech was system directed. The output from the TTS component 580 may also allow the system to determine whether a user captured utterance is responsive to the TTS output, thus improving system operation.

The system directed input detector 585 may also use echo return loss enhancement (ERLE) and/or acoustic echo cancellation (AEC) data to avoid processing of audio data generated by the system.

As shown in FIG. 6, the system directed input detector 585 may simply user audio data to determine whether an input is system directed (for example, system directed audio detector 640 may output an SDD result 642). This may be true particularly when no image data is available (for example for a device without a camera). If image data 521 is available, however, the system may also be configured to use image data 521 to determine if an input is system directed. The image data 521 may include image data captured by device 110 and/or image data captured by other device(s) in the environment of device 110. The audio data 111, image data 521 and other data 681 may be timestamped or otherwise correlated so that the system directed input detector 585 may determine that the data being analyzed all relates to a same time window so as to ensure alignment of data considered with regard to whether a particular input is system directed. For example, the system directed input detector 585 may determine system directedness scores for every frame of audio data/every image of a video stream and may align and/or window them to determine a single overall score for a particular input that corresponds to a group of audio frames/images.

Image data 521 along with other data 681 may be received by feature extractor 635. The feature extractor may create one or more feature vectors 636 which may represent the image data 521/other data 681. In certain examples, other data 681 may include data from an image processing component which may include information about faces, gesture, etc. detected in the image data 521. For privacy protection purposes, in certain configurations any image processing/ results thereof may be obtained from an image processing component located on device 110 or on a home component as opposed to an image processing component located on a cloud or other remote system component(s) so that image data 521 is not sent remote from the user's home unless the system directed input detector component 585 has determined that the input is system directed. Though this may be adjusted depending on user preferences/system configuration.

The feature vector 636 may be passed to the user detector 625. The user detector 625 (which may use various components/operations of image processing component, user recognition component 595, etc.) may be configured to process image data 521 and/or feature vector 636 to determine information about the user's behavior which in turn may be used to determine if an input is system directed. For example, the user detector 625 may be configured to determine the user's position/behavior with respect to device 110/system 100. The user detector 625 may also be configured to determine whether a user's mouth is opening/closing in a manner that suggests the user is speaking. The user detector 625 may also be configured to determine whether a user is nodding or shaking his/her head. The user detector 625 may also be configured to determine whether a user's gaze is directed to the device 110, to another user, or to another object. For example, the use detector 625 may include, or be configured to use data from, a gaze detector. The user detector 625 may also be configured to determine gestures of the user such as a shoulder shrug, pointing toward an object, a wave, a hand up to indicate an instruction to stop, or a fingers moving to indicate an instruction to continue, holding up a certain number of fingers, putting a thumb up, etc. The user detector 625 may also be configured to determine a user's position/orientation such as facing another user, facing the device 110, whether their back is turned, etc. The user detector 625 may also be configured to determine relative positions of multiple users that appear in image data (and/or are speaking in audio data 111 which may also be considered by the user detector 625 along with feature vector 631), for example which users are closer to a device 110 and which are farther away. The user detector 625 (and/or other component) may also be configured to identify other objects represented in image data and determine whether objects are relevant to a dialog or system interaction (for example determining if a user is referring to an object through a movement or speech).

The user detector 625 may operate one or more models (e.g., one or more classifiers) to determine if certain situations are represented in the image data 521. For example the user detector 625 may employ a visual directedness classifier that may determine, for each face detected in the image data 521 whether that face is looking at the device 110 or not. For example, a light-weight convolutional neural network (CNN) may be used which takes a face image cropped from the result of the face detector as input and output a [0,1] score of how likely the face is directed to the camera or not. Another technique may include to determine a three-dimensional (3D) landmark of each face, estimate the 3D angle of the face and predict a directness score based on the 3D angle.

The user detector 625 (or other component(s)) may be configured to track a face in image data to determine which faces represented may belong to a same person. The system may user IOU based tracker, a mean-shift based tracker, a particle filter based tracker or other technique.

The user detector 625 (or other component(s) such as those in user recognition component 595) may be configured to determine whether a face represented in image data belongs to a person who is speaking or not, thus performing active speaker detection. The system may take the output from the face tracker and aggregate a sequence of face from the same person as input and predict whether this person is speaking or not. Lip motion, user ID, detected voice data, and other data may be used to determine whether a user is speaking or not.

The system directed image detector 650 may then determine, based on information from the user detector 625 as based on the image data whether an input relating to the image data is system directed. The system directed image detector 650 may also operate on other input data, for example image data including raw image data 521, image data including feature data 636 based on raw image data, other data 681, or other data. The determination by the system directed image detector 650 may result in a score indicating whether the input is system directed based on the image data. If no audio data is available, the indication may be output as SDD result 642. If audio data is available, the indication may be sent to system directed detector 670 which may consider information from both system directed audio detector 640 and system directed image detector 650. The system directed detector 670 may then process the data from both system directed audio detector 640 and system directed image detector 650 to come up with an overall determination as to whether an input was system directed, which may be output as SDD result 642. The system directed detector 670 may consider not only data output from system directed audio detector 640 and system directed image detector 650 but also other data/metadata corresponding to the input (for example, image data/feature data 636, audio data/feature data 631, image data 521, audio data 111, or the like discussed with regard to FIG. 6. The system directed detector 670 may include one or more models which may analyze the various input data to make a determination regarding SDD result 642.

In one example the determination of the system directed detector 670 may be based on "AND" logic, for example determining an input is system directed only if affirmative data is received from both system directed audio detector 640 and system directed image detector 650. In another example the determination of the system directed detector 670 may be based on "OR" logic, for example determining an input is system directed if affirmative data is received from either system directed audio detector 640 or system directed image detector 650. In another example the data received from system directed audio detector 640 and system directed image detector 650 are weighted individually based on other information available to system directed detector 670 to determine to what extend audio and/or image data should impact the decision of whether an input is system directed.

The system directed input detector 585 may also receive information from a wakeword component 520. For example, an indication that a wakeword was detected (e.g., WW data 644) may be considered by the system directed input detector 585 (e.g., by system directed audio detector 640, system directed detector 670, etc.) as part of the overall consideration of whether a system input was device directed. Detection of a wakeword may be considered a strong signal that a particular input was device directed.

If an input is determined to be system directed, the data related to the input may be sent to downstream components for further processing (e.g., to language processing 192). If an input is determined not to be system directed, the system may take no further action regarding the data related to the input and may allow it to be deleted. In certain configurations, to maintain privacy, the operations to determine whether an input is system directed are performed by device 110 (or home server(s) 120) and only if the input is determined to be system directed is further data (such as audio data 111 or image data 521) sent to a system component(s) 120 that is outside a user's home or other direct control.

Figure 7:
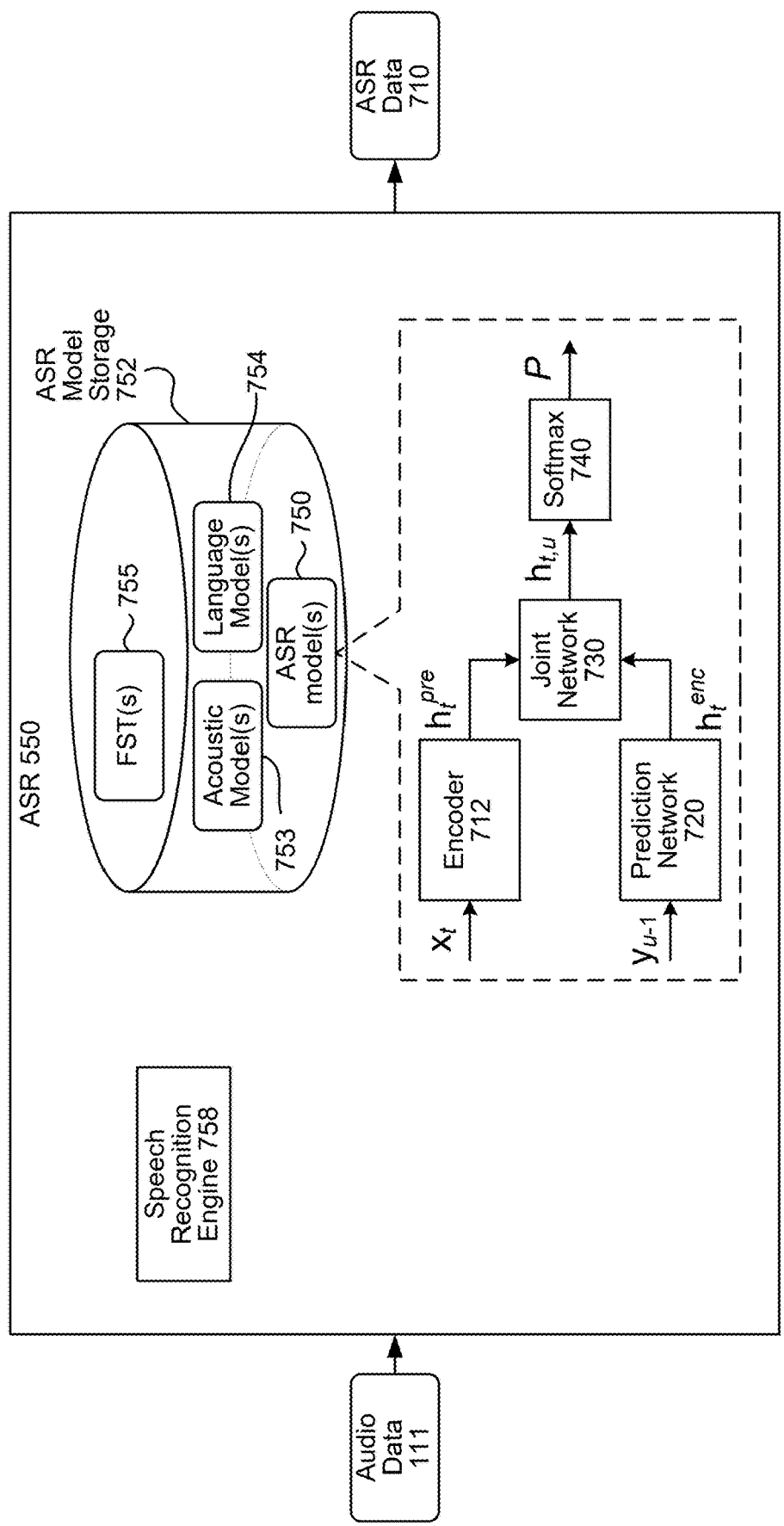
FIG. 7 is a conceptual diagram of an ASR component, according to embodiments of the present disclosure.

FIG. 7 is a conceptual diagram of an ASR component 550, according to embodiments of the present disclosure. The ASR component 550 may interpret a spoken natural language input based on the similarity between the spoken natural language input and pre-established language models 754 stored in an ASR model storage 752. For example, the ASR component 550 may compare the audio data with models for sounds (e.g., subword units or phonemes) and sequences of sounds to identify words that match the sequence of sounds spoken in the natural language input. Alternatively, the ASR component 550 may use a finite state transducer (FST) 755 to implement the language model functions.

When the ASR component 550 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 753 stored in the ASR model storage 752), and the likelihood that a particular word, which matches the sounds, would be included in the sentence at the specific location (e.g., using a language or grammar model 754). Based on the considered factors and the assigned confidence score, the ASR component 550 may output an ASR hypothesis that most likely matches the spoken natural language input, or may output multiple ASR hypotheses in the form of a lattice or an N-best list, with each ASR hypothesis corresponding to a respective score.

The ASR component 550 may include a speech recognition engine 758. The ASR component 550 receives audio data 111 (for example, received from a local device 110 having processed audio detected by a microphone by an acoustic front end (AFE) or other component). The speech recognition engine 758 compares the audio data 111 with acoustic models 753, language models 754, FST(s) 755, and/or other data models and information for recognizing the speech conveyed in the audio data. The audio data 111 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some cases, feature vectors of the audio data may arrive at the supporting system component(s) 120 encoded, in which case they may be decoded by the speech recognition engine 758 and/or prior to processing by the speech recognition engine 758.

In some implementations, the ASR component 550 may process the audio data 111 using the ASR model 750. The ASR model 750 may be, for example, a recurrent neural network such as an RNN-T. An example RNN-T architecture is illustrated in FIG. 7. The ASR model 750 may predict a probability (y|x) of labels $y=(y_1, \ldots, y_u)$ given acoustic features $x=(x_1, \ldots, x_t)$. During inference, the ASR model 750 can generate an N-best list using, for example, a beam search decoding algorithm. The ASR model 750 may include an encoder 712, a prediction network 720, a joint network 730, and a softmax 740. The encoder 712 may be similar or analogous to an acoustic model (e.g., similar to the acoustic model 753 described below), and may process a sequence of acoustic input features to generate encoded hidden representations. The prediction network 720 may be similar or analogous to a language model (e.g., similar to the language model 754 described below), and may process the previous output label predictions, and map them to corresponding hidden representations. The joint network 730 may be, for example, a feed forward neural network (NN) that may process hidden representations from both the encoder 712 and prediction network 720, and predict output label probabilities. The softmax 740 may be a function implemented (e.g., as a layer of the joint network 730) to normalize the predicted output probabilities.

The speech recognition engine 758 may process the audio data 111 with reference to information stored in the ASR model storage 752. Feature vectors of the audio data 111 may arrive at the system component(s) encoded, in which case they may be decoded prior to processing by the speech recognition engine 758.

The speech recognition engine 758 attempts to match received feature vectors to language acoustic units (e.g., phonemes) and words as known in the stored acoustic models 753, language models 754, and FST(s) 755. For example, audio data 111 may be processed by one or more acoustic model(s) 753 to determine acoustic unit data. The acoustic unit data may include indicators of acoustic units detected in the audio data 111 by the ASR component 550. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 754 (and/or using FST 755) to determine ASR data 710. The ASR data 710 can include one or more hypotheses. One or more of the hypotheses represented in the ASR data 710 may then be sent to further components (such as the NLU component 560) for further processing as discussed herein. The ASR data 710 may include representations of text of an utterance, such as words, subword units, or the like.

The speech recognition engine 758 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 550 will output ASR hypotheses that make sense grammatically. The specific models used may be general models or may be models corresponding to a particular domain, such as music, banking, etc.

The speech recognition engine 758 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 758 may use the acoustic model(s) 753 to attempt to match received audio feature vectors to words or subword acoustic units. An acoustic unit may be a senone, phoneme, phoneme in context, syllable, part of a syllable, syllable in context, or any other such portion of a word. The speech recognition engine 758 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 550 outputs ASR hypotheses that make sense grammatically.

The speech recognition engine 758 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 758, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 758 may also compute scores of branches of the paths based on language models or grammars. Language modeling involves determining scores for what words are likely to be used together to form coherent words and sentences. Application of a language model may improve the likelihood that the ASR component 550 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 8:
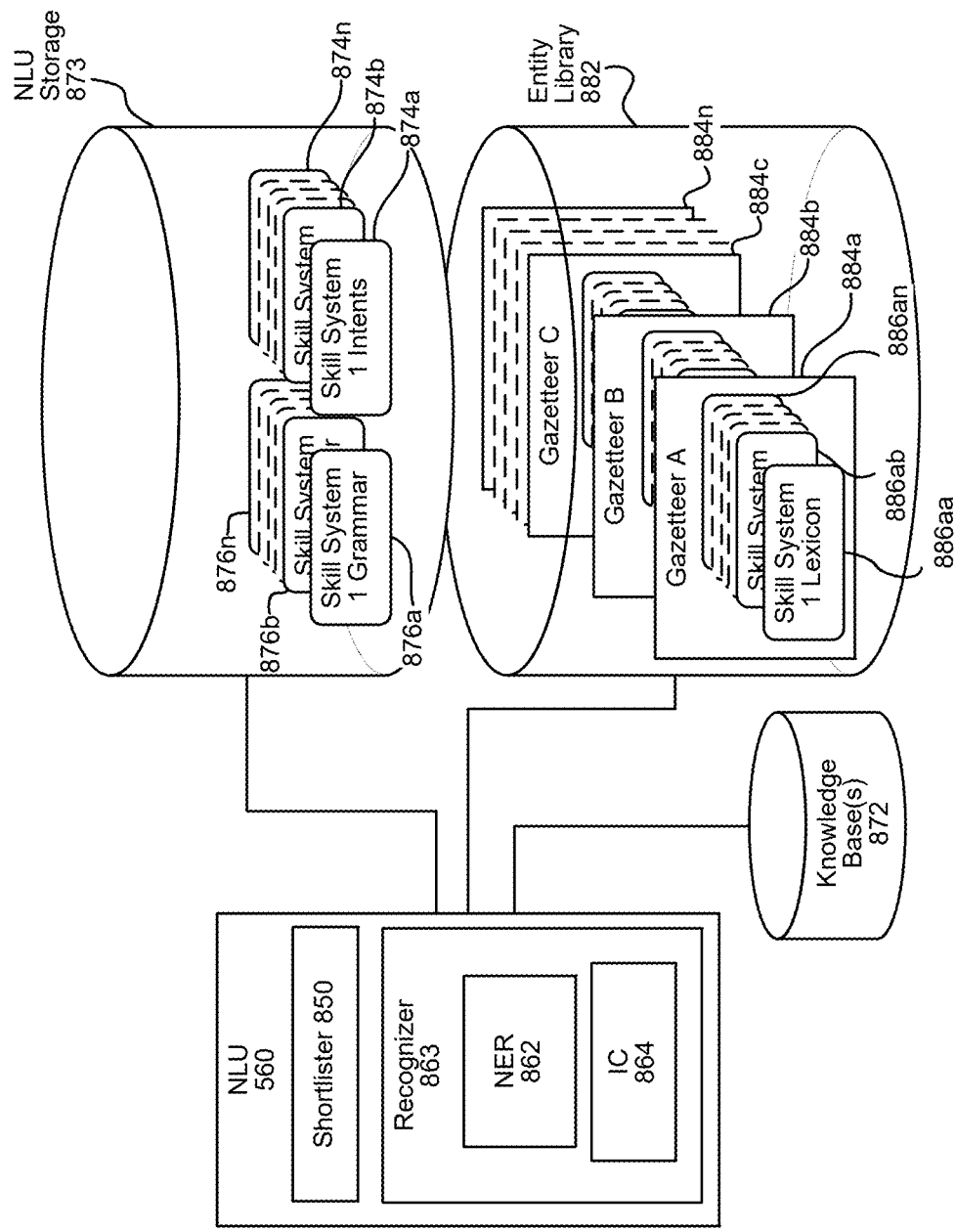
FIG. 8 is a conceptual diagram of how natural language processing is performed, according to embodiments of the present disclosure.
Figure 9:
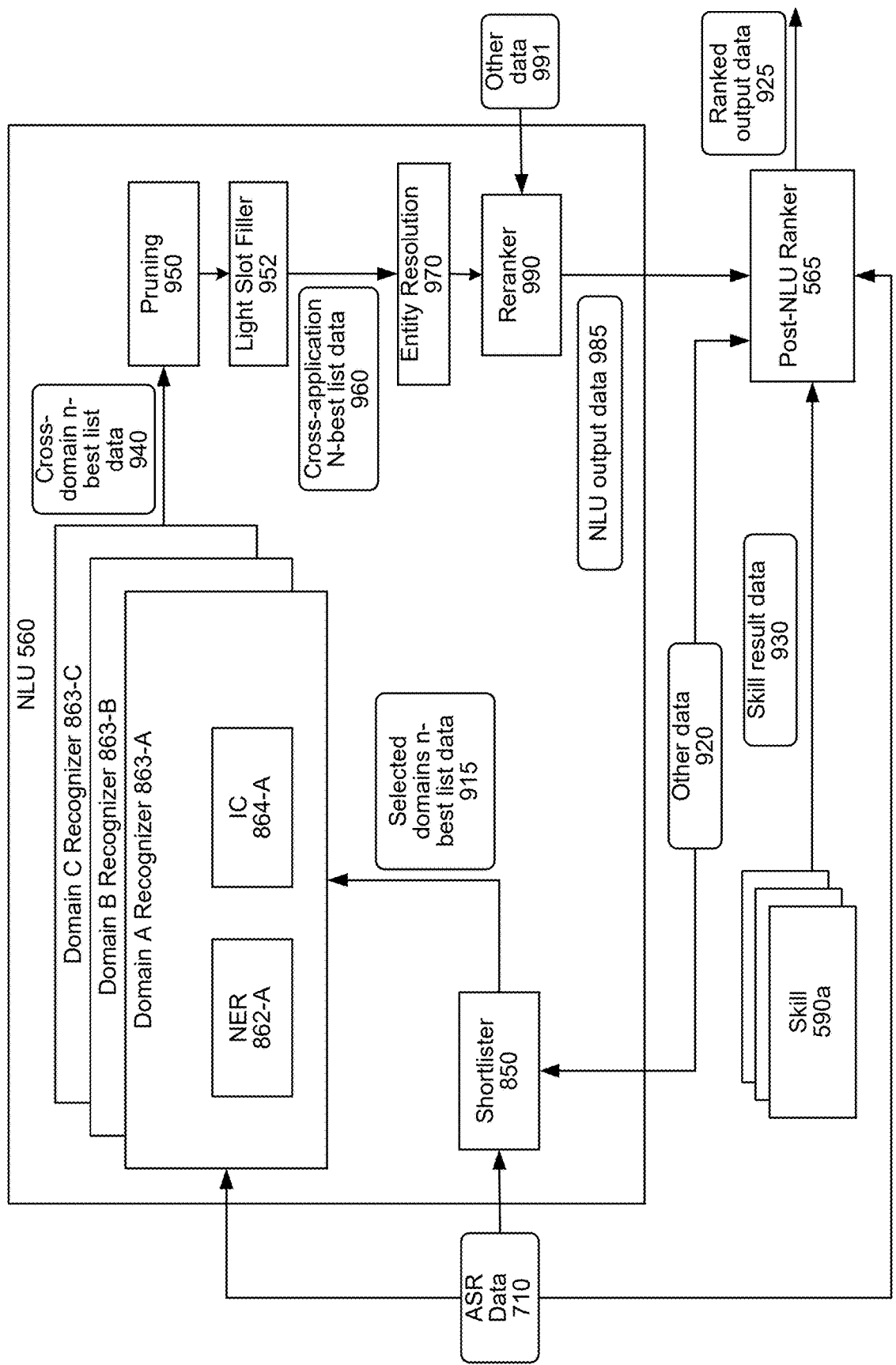
FIG. 9 is a conceptual diagram of how natural language processing is performed, according to embodiments of the present disclosure.

FIGS. 8 and 9 illustrates how the NLU component 560 may perform NLU processing. FIG. 8 is a conceptual diagram of how natural language processing is performed, according to embodiments of the present disclosure. And FIG. 9 is a conceptual diagram of how natural language processing is performed, according to embodiments of the present disclosure.

FIG. 8 illustrates how NLU processing is performed on text data. The NLU component 560 may process text data including several ASR hypotheses of a single user input. For example, if the ASR component 550 outputs text data including an n-best list of ASR hypotheses, the NLU component 560 may process the text data with respect to all (or a portion of) the ASR hypotheses represented therein.

The NLU component 560 may annotate text data by parsing and/or tagging the text data. For example, for the text data "tell me the weather for Seattle," the NLU component 560 may tag "tell me the weather for Seattle" as an <OutputWeather> intent as well as separately tag "Seattle" as a location for the weather information.

The NLU component 560 may include a shortlister component 850. The shortlister component 850 selects skills that may execute with respect to ASR output data 710 input to the NLU component 560 (e.g., applications that may execute with respect to the user input). The ASR output data 710 (which may also be referred to as ASR data 710) may include representations of text of an utterance, such as words, subword units, or the like. The shortlister component 850 thus limits downstream, more resource intensive NLU processes to being performed with respect to skills that may execute with respect to the user input.

Without a shortlister component 850, the NLU component 560 may process ASR output data 710 input thereto with respect to every skill of the system, either in parallel, in series, or using some combination thereof. By implementing a shortlister component 850, the NLU component 560 may process ASR output data 710 with respect to only the skills that may execute with respect to the user input. This reduces total compute power and latency attributed to NLU processing.

The shortlister component 850 may include one or more trained models. The model(s) may be trained to recognize various forms of user inputs that may be received by the system component(s) 120. For example, during a training period skill system component(s) 525 associated with a skill may provide the system component(s) 120 with training text data representing sample user inputs that may be provided by a user to invoke the skill. For example, for a ride sharing skill, a skill system component(s) 525 associated with the ride sharing skill may provide the system component(s) 120 with training text data including text corresponding to "get me a cab to [location]," "get me a ride to [location]," "book me a cab to [location]," "book me a ride to [location]," etc. The one or more trained models that will be used by the shortlister component 850 may be trained, using the training text data representing sample user inputs, to determine other potentially related user input structures that users may try to use to invoke the particular skill. During training, the system component(s) 120 may solicit the skill system component(s) 525 associated with the skill regarding whether the determined other user input structures are permissible, from the perspective of the skill system component(s) 525, to be used to invoke the skill. The alternate user input structures may be derived by one or more trained models during model training and/or may be based on user input structures provided by different skills. The skill system component(s) 525 associated with a particular skill may also provide the system component(s) 120 with training text data indicating grammar and annotations. The system component(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 850 may be trained with respect to a different skill. Alternatively, the shortlister component 850 may use one trained model per domain, such as one trained model for skills associated with a weather domain, one trained model for skills associated with a ride sharing domain, etc.

The system component(s) 120 may use the sample user inputs provided by a skill system component(s) 525, and related sample user inputs potentially determined during training, as binary examples to train a model associated with a skill associated with the skill system component(s) 525. The model associated with the particular skill may then be operated at runtime by the shortlister component 850. For example, some sample user inputs may be positive examples (e.g., user inputs that may be used to invoke the skill). Other sample user inputs may be negative examples (e.g., user inputs that may not be used to invoke the skill).

As described above, the shortlister component 850 may include a different trained model for each skill of the system, a different trained model for each domain, or some other combination of trained model(s). For example, the shortlister component 850 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 850 to output indications of only a portion of the skills that the ASR output data 710 may relate to. For example, a user input may correspond to "tell me about Tom Collins." If the model is clustered based on domain, the shortlister component 850 may determine the user input corresponds to a recipe skill (e.g., a drink recipe) even though the user input may also correspond to an information skill (e.g., including information about a person named Tom Collins).

The NLU component 560 may include one or more recognizers 863. In at least some embodiments, a recognizer 863 may be associated with a skill system component(s) 525 (e.g., the recognizer may be configured to interpret text data to correspond to the skill system component(s) 525). In at least some other examples, a recognizer 863 may be associated with a domain such as smart home, video, music, weather, custom, etc. (e.g., the recognizer may be configured to interpret text data to correspond to the domain).

If the shortlister component 850 determines ASR output data 710 is potentially associated with multiple domains, the recognizers 863 associated with the domains may process the ASR output data 710, while recognizers 863 not indicated in the shortlister component 850's output may not process the ASR output data 710. The "shortlisted" recognizers 863 may process the ASR output data 710 in parallel, in series, partially in parallel, etc. For example, if ASR output data 710 potentially relates to both a communications domain and a music domain, a recognizer associated with the communications domain may process the ASR output data 710 in parallel, or partially in parallel, with a recognizer associated with the music domain processing the ASR output data 710.

Each recognizer 863 may include a named entity recognition (NER) component 862. The NER component 862 attempts to identify grammars and lexical information that may be used to construe meaning with respect to text data input therein. The NER component 862 identifies portions of text data that correspond to a named entity associated with a domain, associated with the recognizer 863 implementing the NER component 862. The NER component 862 (or other component of the NLU component 560) may also determine whether a word refers to an entity whose identity is not explicitly mentioned in the text data, for example "him," "her," "it" or other anaphora, exophora, or the like.

Each recognizer 863, and more specifically each NER component 862, may be associated with a particular grammar database 876, a particular set of intents/actions 874, and a particular personalized lexicon 886. The grammar databases 876, and intents/actions 874 may be stored in an NLU storage 873. Each gazetteer 884 may include domain/skill-indexed lexical information associated with a particular user and/or device 110. For example, a Gazetteer A (884a) includes skill-indexed lexical information 886aa to 886an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 862 applies grammar information 876 and lexical information 886 associated with a domain (associated with the recognizer 863 implementing the NER component 862) to determine a mention of one or more entities in text data. In this manner, the NER component 862 identifies "slots" (each corresponding to one or more particular words in text data) that may be useful for later processing. The NER component 862 may also label each slot with a type (e.g., noun, place, city, artist name, song name, etc.).

Each grammar database 876 includes the names of entities (i.e., nouns) commonly found in speech about the particular domain to which the grammar database 876 relates, whereas the lexical information 886 is personalized to the user and/or the device 110 from which the user input originated. For example, a grammar database 876 associated with a shopping domain may include a database of words commonly used when people discuss shopping.

A downstream process called entity resolution (discussed in detail elsewhere herein) links a slot of text data to a specific entity known to the system. To perform entity resolution, the NLU component 560 may utilize gazetteer information (884a-884n) stored in an entity library storage 882. The gazetteer information 884 may be used to match text data (representing a portion of the user input) with text data representing known entities, such as song titles, contact names, etc. Gazetteers 884 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 863 may also include an intent classification (IC) component 864. An IC component 864 parses text data to determine an intent(s) (associated with the domain associated with the recognizer 863 implementing the IC component 864) that potentially represents the user input. An intent represents to an action a user desires be performed. An IC component 864 may communicate with a database 874 of words linked to intents. For example, a music intent database may link words and phrases such as "quiet," "volume off," and "mute" to a <Mute> intent. An IC component 864 identifies potential intents by comparing words and phrases in text data (representing at least a portion of the user input) to the words and phrases in an intents database 874 (associated with the domain that is associated with the recognizer 863 implementing the IC component 864).

The intents identifiable by a specific IC component 864 are linked to domain-specific (i.e., the domain associated with the recognizer 863 implementing the IC component 864) grammar frameworks 876 with "slots" to be filled. Each slot of a grammar framework 876 corresponds to a portion of text data that the system believes corresponds to an entity. For example, a grammar framework 876 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 876 may not be structured as sentences, but rather based on associating slots with grammatical tags.

For example, an NER component 862 may parse text data to identify words as subject, object, verb, preposition, etc. based on grammar rules and/or models prior to recognizing named entities in the text data. An IC component 864 (implemented by the same recognizer 863 as the NER component 862) may use the identified verb to identify an intent. The NER component 862 may then determine a grammar model 876 associated with the identified intent. For example, a grammar model 876 for an intent corresponding to <PlayMusic> may specify a list of slots applicable to play the identified "object" and any object modifier (e.g., a prepositional phrase), such as {Artist Name}, {Album Name}, {Song name}, etc. The NER component 862 may then search corresponding fields in a lexicon 886 (associated with the domain associated with the recognizer 863 implementing the NER component 862), attempting to match words and phrases in text data the NER component 862 previously tagged as a grammatical object or object modifier with those identified in the lexicon 886.

An NER component 862 may perform semantic tagging, which is the labeling of a word or combination of words according to their type/semantic meaning. An NER component 862 may parse text data using heuristic grammar rules, or a model may be constructed using techniques such as Hidden Markov Models, maximum entropy models, log linear models, conditional random fields (CRF), and the like. For example, an NER component 862 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 862 identifies "Play" as a verb based on a word database associated with the music domain, which an IC component 864 (also implemented by the music domain recognizer) may determine corresponds to a <PlayMusic> intent. At this stage, no determination has been made as to the meaning of "mother's little helper" or "the rolling stones," but based on grammar rules and models, the NER component 862 has determined the text of these phrases relates to the grammatical object (i.e., entity) of the user input represented in the text data.

An NER component 862 may tag text data to attribute meaning thereto. For example, an NER component 862 may tag "play mother's little helper by the rolling stones" as: {domain} Music, {intent}<PlayMusic>, {artist name} rolling stones, {media type} SONG, and {song title} mother's little helper. For further example, the NER component 862 may tag "play songs by the rolling stones" as: {domain} Music, {intent}<PlayMusic>, {artist name} rolling stones, and {media type} SONG.

The shortlister component 850 may receive ASR output data 710 output from the ASR component 550) or output from the device 110b (as illustrated in FIG. 9). The ASR component 550 may embed the ASR output data 710 into a form processable by a trained model(s) using sentence embedding techniques as known in the art. Sentence embedding results in the ASR output data 710 including text in a structure that enables the trained models of the shortlister component 850 to operate on the ASR output data 710. For example, an embedding of the ASR output data 710 may be a vector representation of the ASR output data 710.

The shortlister component 850 may make binary determinations (e.g., yes or no) regarding which domains relate to the ASR output data 710. The shortlister component 850 may make such determinations using the one or more trained models described herein above. If the shortlister component 850 implements a single trained model for each domain, the shortlister component 850 may simply run the models that are associated with enabled domains as indicated in a user profile associated with the device 110 and/or user that originated the user input.

The shortlister component 850 may generate n-best list data 915 representing domains that may execute with respect to the user input represented in the ASR output data 710. The size of the n-best list represented in the n-best list data 915 is configurable. In an example, the n-best list data 915 may indicate every domain of the system as well as contain an indication, for each domain, regarding whether the domain is likely capable to execute the user input represented in the ASR output data 710. In another example, instead of indicating every domain of the system, the n-best list data 915 may only indicate the domains that are likely to be able to execute the user input represented in the ASR output data 710. In yet another example, the shortlister component 850 may implement thresholding such that the n-best list data 915 may indicate no more than a maximum number of domains that may execute the user input represented in the ASR output data 710. In an example, the threshold number of domains that may be represented in the n-best list data 915 is ten. In another example, the domains included in the n-best list data 915 may be limited by a threshold a score, where only domains indicating a likelihood to handle the user input is above a certain score (as determined by processing the ASR output data 710 by the shortlister component 850 relative to such domains) are included in the n-best list data 915.

The ASR output data 710 may correspond to more than one ASR hypothesis. When this occurs, the shortlister component 850 may output a different n-best list (represented in the n-best list data 915) for each ASR hypothesis. Alternatively, the shortlister component 850 may output a single n-best list representing the domains that are related to the multiple ASR hypotheses represented in the ASR output data 710.

As indicated above, the shortlister component 850 may implement thresholding such that an n-best list output therefrom may include no more than a threshold number of entries. If the ASR output data 710 includes more than one ASR hypothesis, the n-best list output by the shortlister component 850 may include no more than a threshold number of entries irrespective of the number of ASR hypotheses output by the ASR component 550. Alternatively or in addition, the n-best list output by the shortlister component 850 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 710, the shortlister component 850 may generate confidence scores representing likelihoods that domains relate to the ASR output data 710. If the shortlister component 850 implements a different trained model for each domain, the shortlister component 850 may generate a different confidence score for each individual domain trained model that is run. If the shortlister component 850 runs the models of every domain when ASR output data 710 is received, the shortlister component 850 may generate a different confidence score for each domain of the system. If the shortlister component 850 runs the models of only the domains that are associated with skills indicated as enabled in a user profile associated with the device 110 and/or user that originated the user input, the shortlister component 850 may only generate a different confidence score for each domain associated with at least one enabled skill. If the shortlister component 850 implements a single trained model with domain specifically trained portions, the shortlister component 850 may generate a different confidence score for each domain who's specifically trained portion is run. The shortlister component 850 may perform matrix vector modification to obtain confidence scores for all domains of the system in a single instance of processing of the ASR output data 710.

N-best list data 915 including confidence scores that may be output by the shortlister component 850 may be represented as, for example:
Search domain, 0.67
Recipe domain, 0.62
Information domain, 0.57
Shopping domain, 0.42

As indicated, the confidence scores output by the shortlister component 850 may be numeric values. The confidence scores output by the shortlister component 850 may alternatively be binned values (e.g., high, medium, low).

The n-best list may only include entries for domains having a confidence score satisfying (e.g., equaling or exceeding) a minimum threshold confidence score. Alternatively, the shortlister component 850 may include entries for all domains associated with user enabled skills, even if one or more of the domains are associated with confidence scores that do not satisfy the minimum threshold confidence score.

The shortlister component 850 may consider other data 920 when determining which domains may relate to the user input represented in the ASR output data 710 as well as respective confidence scores. The other data 920 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 920 may include an indicator of the user associated with the ASR output data 710, for example as determined by the user recognition component 595.

The other data 920 may be character embedded prior to being input to the shortlister component 850. The other data 920 may alternatively be embedded using other techniques known in the art prior to being input to the shortlister component 850.

The other data 920 may also include data indicating the domains associated with skills that are enabled with respect to the device 110 and/or user that originated the user input. The shortlister component 850 may use such data to determine which domain-specific trained models to run. That is, the shortlister component 850 may determine to only run the trained models associated with domains that are associated with user-enabled skills. The shortlister component 850 may alternatively use such data to alter confidence scores of domains.

As an example, considering two domains, a first domain associated with at least one enabled skill and a second domain not associated with any user-enabled skills of the user that originated the user input, the shortlister component 850 may run a first model specific to the first domain as well as a second model specific to the second domain. Alternatively, the shortlister component 850 may run a model configured to determine a score for each of the first and second domains. The shortlister component 850 may determine a same confidence score for each of the first and second domains in the first instance. The shortlister component 850 may then alter those confidence scores based on which domains is associated with at least one skill enabled by the present user. For example, the shortlister component 850 may increase the confidence score associated with the domain associated with at least one enabled skill while leaving the confidence score associated with the other domain the same. Alternatively, the shortlister component 850 may leave the confidence score associated with the domain associated with at least one enabled skill the same while decreasing the confidence score associated with the other domain. Moreover, the shortlister component 850 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 570. When the shortlister component 850 receives the ASR output data 710, the shortlister component 850 may determine whether profile data associated with the user and/or device 110 that originated the command includes an indication of enabled skills.

The other data 920 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 850 may use such data to determine which domain-specific trained models to run. For example, if the device 110 corresponds to a displayless type device, the shortlister component 850 may determine not to run trained models specific to domains that output video data. The shortlister component 850 may alternatively use such data to alter confidence scores of domains.

As an example, considering two domains, one that outputs audio data and another that outputs video data, the shortlister component 850 may run a first model specific to the domain that generates audio data as well as a second model specific to the domain that generates video data. Alternatively the shortlister component 850 may run a model configured to determine a score for each domain. The shortlister component 850 may determine a same confidence score for each of the domains in the first instance. The shortlister component 850 may then alter the original confidence scores based on the type of the device 110 that originated the user input corresponding to the ASR output data 710. For example, if the device 110 is a displayless device, the shortlister component 850 may increase the confidence score associated with the domain that generates audio data while leaving the confidence score associated with the domain that generates video data the same. Alternatively, if the device 110 is a displayless device, the shortlister component 850 may leave the confidence score associated with the domain that generates audio data the same while decreasing the confidence score associated with the domain that generates video data. Moreover, if the device 110 is a displayless device, the shortlister component 850 may increase the confidence score associated with the domain that generates audio data as well as decrease the confidence score associated with the domain that generates video data.

The type of device information represented in the other data 920 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 920 may represent the smart TV of other display device, and not the displayless device that captured the spoken user input.

The other data 920 may also include data indicating the user input originating device's speed, location, or other mobility information. For example, the device may correspond to a vehicle including a display. If the vehicle is moving, the shortlister component 850 may decrease the confidence score associated with a domain that generates video data as it may be undesirable to output video content to a user while the user is driving. The device may output data to the system component(s) 120 indicating when the device is moving.

The other data 920 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 850 may use such data to alter confidence scores of domains. For example, the shortlister component 850 may run a first model specific to a first domain as well as a second model specific to a second domain. Alternatively, the shortlister component 850 may run a model configured to determine a score for each domain. The shortlister component 850 may also determine a same confidence score for each of the domains in the first instance. The shortlister component 850 may then alter the original confidence scores based on the first domain being invoked to cause the system to output content while the current user input was received. Based on the first domain being invoked, the shortlister component 850 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 915 generated by the shortlister component 850 as well as the different types of other data 920 considered by the shortlister component 850 are configurable. For example, the shortlister component 850 may update confidence scores as more other data 920 is considered. For further example, the n-best list data 915 may exclude relevant domains if thresholding is implemented. Thus, for example, the shortlister component 850 may include an indication of a domain in the n-best list 915 unless the shortlister component 850 is one hundred percent confident that the domain may not execute the user input represented in the ASR output data 710 (e.g., the shortlister component 850 determines a confidence score of zero for the domain).

The shortlister component 850 may send the ASR output data 710 to recognizers 863 associated with domains represented in the n-best list data 915. Alternatively, the shortlister component 850 may send the n-best list data 915 or some other indicator of the selected subset of domains to another component (such as the orchestrator component 530) which may in turn send the ASR output data 710 to the recognizers 863 corresponding to the domains included in the n-best list data 915 or otherwise indicated in the indicator. If the shortlister component 850 generates an n-best list representing domains without any associated confidence scores, the shortlister component 850/orchestrator component 530 may send the ASR output data 710 to recognizers 863 associated with domains that the shortlister component 850 determines may execute the user input. If the shortlister component 850 generates an n-best list representing domains with associated confidence scores, the shortlister component 850/orchestrator component 530 may send the ASR output data 710 to recognizers 863 associated with domains associated with confidence scores satisfying (e.g., meeting or exceeding) a threshold minimum confidence score.

A recognizer 863 may output tagged text data generated by an NER component 862 and an IC component 864, as described herein above. The NLU component 560 may compile the output tagged text data of the recognizers 863 into a single cross-domain n-best list 940 and may send the cross-domain n-best list 940 to a pruning component 950. Each entry of tagged text (e.g., each NLU hypothesis) represented in the cross-domain n-best list data 940 may be associated with a respective score indicating a likelihood that the NLU hypothesis corresponds to the domain associated with the recognizer 863 from which the NLU hypothesis was output. For example, the cross-domain n-best list data 940 may be represented as (with each line corresponding to a different NLU hypothesis):

Intent: <PlayMusic> ArtistName: Beethoven SongName: Waldstein Sonata

Intent: <Play Video> ArtistName: Beethoven VideoName: Waldstein Sonata

Intent: <PlayMusic> ArtistName: Beethoven AlbumName: Waldstein Sonata

Intent: <PlayMusic> SongName: Waldstein Sonata

The pruning component 950 may sort the NLU hypotheses represented in the cross-domain n-best list data 940 according to their respective scores. The pruning component 950 may perform score thresholding with respect to the cross-domain NLU hypotheses. For example, the pruning component 950 may select NLU hypotheses associated with scores satisfying (e.g., meeting and/or exceeding) a threshold score. The pruning component 950 may also or alternatively perform number of NLU hypothesis thresholding. For example, the pruning component 950 may select the top scoring NLU hypothesis(es). The pruning component 950 may output a portion of the NLU hypotheses input thereto. The purpose of the pruning component 950 is to create a reduced list of NLU hypotheses so that downstream, more resource intensive, processes may only operate on the NLU hypotheses that most likely represent the user's intent.

The NLU component 560 may include a light slot filler component 952. The light slot filler component 952 can take text from slots represented in the NLU hypotheses output by the pruning component 950 and alter them to make the text more easily processed by downstream components. The light slot filler component 952 may perform low latency operations that do not involve heavy operations such as reference to a knowledge base (e.g., 872). The purpose of the light slot filler component 952 is to replace words with other words or values that may be more easily understood by downstream components. For example, if a NLU hypothesis includes the word "tomorrow," the light slot filler component 952 may replace the word "tomorrow" with an actual date for purposes of downstream processing. Similarly, the light slot filler component 952 may replace the word "CD" with "album" or the words "compact disc." The replaced words are then included in the cross-domain n-best list data 960.

The cross-domain n-best list data 960 may be input to an entity resolution component 970. The entity resolution component 970 can apply rules or other instructions to standardize labels or tokens from previous stages into an intent/slot representation. The precise transformation may depend on the domain. For example, for a travel domain, the entity resolution component 970 may transform text corresponding to "Boston airport" to the standard BOS three-letter code referring to the airport. The entity resolution component 970 can refer to a knowledge base (e.g., 872) that is used to specifically identify the precise entity referred to in each slot of each NLU hypothesis represented in the cross-domain n-best list data 960. Specific intent/slot combinations may also be tied to a particular source, which may then be used to resolve the text. In the example "play songs by the stones," the entity resolution component 970 may reference a personal music catalog, Amazon Music account, a user profile, or the like. The entity resolution component 970 may output an altered n-best list that is based on the cross-domain n-best list 960 but that includes more detailed information (e.g., entity IDs) about the specific entities mentioned in the slots and/or more detailed slot data that can eventually be used by a skill. The NLU component 560 may include multiple entity resolution components 970 and each entity resolution component 970 may be specific to one or more domains.

The NLU component 560 may include a reranker 990. The reranker 990 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 970.

The reranker 990 may apply re-scoring, biasing, or other techniques. The reranker 990 may consider not only the data output by the entity resolution component 970, but may also consider other data 991. The other data 991 may include a variety of information. For example, the other data 991 may include skill rating or popularity data. For example, if one skill has a high rating, the reranker 990 may increase the score of a NLU hypothesis that may be processed by the skill. The other data 991 may also include information about skills that have been enabled by the user that originated the user input. For example, the reranker 990 may assign higher scores to NLU hypothesis that may be processed by enabled skills than NLU hypothesis that may be processed by non-enabled skills. The other data 991 may also include data indicating user usage history, such as if the user that originated the user input regularly uses a particular skill or does so at particular times of day. The other data 991 may additionally include data indicating date, time, location, weather, type of device 110, user identifier, context, as well as other information. For example, the reranker 990 may consider when any particular skill is currently active (e.g., music being played, a game being played, etc.).

As illustrated and described, the entity resolution component 970 is implemented prior to the reranker 990. The entity resolution component 970 may alternatively be implemented after the reranker 990. Implementing the entity resolution component 970 after the reranker 990 limits the NLU hypotheses processed by the entity resolution component 970 to only those hypotheses that successfully pass through the reranker 990.

The reranker 990 may be a global reranker (e.g., one that is not specific to any particular domain). Alternatively, the NLU component 560 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 560 may perform NLU processing described above with respect to domains associated with skills wholly implemented as part of the system component(s) 120 (e.g., designated 590 in FIG. 5). The NLU component 560 may separately perform NLU processing described above with respect to domains associated with skills that are at least partially implemented as part of the skill system component(s) 525. In an example, the shortlister component 850 may only process with respect to these latter domains. Results of these two NLU processing paths may be merged into NLU output data 985, which may be sent to a post-NLU ranker 565, which may be implemented by the system component(s) 120.

The post-NLU ranker 565 may include a statistical component that produces a ranked list of intent/skill pairs with associated confidence scores. Each confidence score may indicate an adequacy of the skill's execution of the intent with respect to NLU results data associated with the skill. The post-NLU ranker 565 may operate one or more trained models configured to process the NLU results data 985, skill result data 930, and the other data 920 in order to output ranked output data 925. The ranked output data 925 may include an n-best list where the NLU hypotheses in the NLU results data 985 are reordered such that the n-best list in the ranked output data 925 represents a prioritized list of skills to respond to a user input as determined by the post-NLU ranker 565. The ranked output data 925 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 565 enables the system to better determine the best skill to execute the user input. For example, first and second NLU hypotheses in the NLU results data 985 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 565 (or other scheduling component such as orchestrator component 530) may solicit the first skill and the second skill to provide potential result data 930 based on the first NLU hypothesis and the second NLU hypothesis, respectively. For example, the post-NLU ranker 565 may send the first NLU hypothesis to the first skill 590*a* along with a request for the first skill 590*a* to at least partially execute with respect to the first NLU hypothesis. The post-NLU ranker 565 may also send the second NLU hypothesis to the second skill 590*b* along with a request for the second skill 590*b* to at least partially execute with respect to the second NLU hypothesis. The post-NLU ranker 565 receives, from the first skill 590*a*, first result data 930*a* generated from the first skill 590*a*'s execution with respect to the first NLU hypothesis. The post-NLU ranker 565 also receives, from the second skill 590*b*, second results data 930*b* generated from the second skill 590*b*'s execution with respect to the second NLU hypothesis.

The result data 930 may include various portions. For example, the result data 930 may include content (e.g., audio data, text data, and/or video data) to be output to a user. The result data 930 may also include a unique identifier used by the system component(s) 120 and/or the skill system component(s) 525 to locate the data to be output to a user. The result data 930 may also include an instruction. For example, if the user input corresponds to "turn on the light," the result data 930 may include an instruction causing the system to turn on a light associated with a profile of the device (110*a*/110*b*) and/or user.

The post-NLU ranker 565 may consider the first result data 930*a* and the second result data 930*b* to alter the first confidence score and the second confidence score of the first NLU hypothesis and the second NLU hypothesis, respectively. That is, the post-NLU ranker 565 may generate a third confidence score based on the first result data 930*a* and the first confidence score. The third confidence score may correspond to how likely the post-NLU ranker 565 determines the first skill will correctly respond to the user input. The post-NLU ranker 565 may also generate a fourth confidence score based on the second result data 930*b* and the second confidence score. One skilled in the art will appreciate that a first difference between the third confidence score and the fourth confidence score may be greater than a second difference between the first confidence score and the second confidence score. The post-NLU ranker 565 may also consider the other data 920 to generate the third confidence score and the fourth confidence score. While it has been described that the post-NLU ranker 565 may alter the confidence scores associated with first and second NLU hypotheses, one skilled in the art will appreciate that the post-NLU ranker 565 may alter the confidence scores of more than two NLU hypotheses. The post-NLU ranker 565 may select the result data 930 associated with the skill 590 with the highest altered confidence score to be the data output in response to the current user input. The post-NLU ranker 565 may also consider the ASR output data 710 to alter the NLU hypotheses confidence scores.

The orchestrator component 530 may, prior to sending the NLU results data 985 to the post-NLU ranker 565, associate intents in the NLU hypotheses with skills 590. For example, if a NLU hypothesis includes a <PlayMusic> intent, the orchestrator component 530 may associate the NLU hypothesis with one or more skills 590 that can execute the <PlayMusic> intent. Thus, the orchestrator component 530 may send the NLU results data 985, including NLU hypotheses paired with skills 590, to the post-NLU ranker 565. In response to ASR output data 710 corresponding to "what should I do for dinner today," the orchestrator component 530 may generates pairs of skills 590 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 565 queries each skill 590, paired with a NLU hypothesis in the NLU output data 985, to provide result data 930 based on the NLU hypothesis with which it is associated. That is, with respect to each skill, the post-NLU ranker 565 colloquially asks the each skill "if given this NLU hypothesis, what would you do with it." According to the above example, the post-NLU ranker 565 may send skills 590 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 565 may query each of the skills 590 in parallel or substantially in parallel.

A skill 590 may provide the post-NLU ranker 565 with various data and indications in response to the post-NLU ranker 565 soliciting the skill 590 for result data 930. A skill 590 may simply provide the post-NLU ranker 565 with an indication of whether or not the skill can execute with respect to the NLU hypothesis it received. A skill 590 may also or alternatively provide the post-NLU ranker 565 with output data generated based on the NLU hypothesis it received. In some situations, a skill 590 may need further information in addition to what is represented in the received NLU hypothesis to provide output data responsive to the user input. In these situations, the skill 590 may provide the post-NLU ranker 565 with result data 930 indicating slots of a framework that the skill 590 further needs filled or entities that the skill 590 further needs resolved prior to the skill 590 being able to provided result data 930 responsive to the user input. The skill 590 may also provide the post-NLU ranker 565 with an instruction and/or computer-generated speech indicating how the skill 590 recommends the system solicit further information needed by the skill 590. The skill 590 may further provide the post-NLU ranker 565 with an indication of whether the skill 590 will have all needed information after the user provides additional information a single time, or whether the skill 590 will need the user to provide various kinds of additional information prior to the skill 590 having all needed information. According to the above example, skills 590 may provide the post-NLU ranker 565 with the following:

Skill 1: indication representing the skill can execute with respect to a NLU hypothesis including the <Help> intent indicator
Skill 2: indication representing the skill needs to the system to obtain further information
Skill 3: indication representing the skill can provide numerous results in response to the third NLU hypothesis including the <DishType> intent indicator Result data 930 includes an indication provided by a skill 590 indicating whether or not the skill 590 can execute with respect to a NLU hypothesis; data generated by a skill 590 based on a NLU hypothesis; as well as an indication provided by a skill 590 indicating the skill 590 needs further information in addition to what is represented in the received NLU hypothesis.

The post-NLU ranker 565 uses the result data 930 provided by the skills 590 to alter the NLU processing confidence scores generated by the reranker 990. That is, the post-NLU ranker 565 uses the result data 930 provided by the queried skills 590 to create larger differences between the NLU processing confidence scores generated by the reranker 990. Without the post-NLU ranker 565, the system may not be confident enough to determine an output in response to a user input, for example when the NLU hypotheses associated with multiple skills are too close for the system to confidently determine a single skill 590 to invoke to respond to the user input. For example, if the system does not implement the post-NLU ranker 565, the system may not be able to determine whether to obtain output data from a general reference information skill or a medical information skill in response to a user input corresponding to "what is acne."

The post-NLU ranker 565 may prefer skills 590 that provide result data 930 responsive to NLU hypotheses over skills 590 that provide result data 930 corresponding to an indication that further information is needed, as well as skills 590 that provide result data 930 indicating they can provide multiple responses to received NLU hypotheses. For example, the post-NLU ranker 565 may generate a first score for a first skill 590*a* that is greater than the first skill's NLU confidence score based on the first skill 590*a* providing result data 930*a* including a response to a NLU hypothesis. For further example, the post-NLU ranker 565 may generate a second score for a second skill 590*b* that is less than the second skill's NLU confidence score based on the second skill 590*b* providing result data 930*b* indicating further information is needed for the second skill 590*b* to provide a response to a NLU hypothesis. Yet further, for example, the post-NLU ranker 565 may generate a third score for a third skill 590*c* that is less than the third skill's NLU confidence score based on the third skill 590*c* providing result data 930*c* indicating the third skill 590*c* can provide multiple responses to a NLU hypothesis.

The post-NLU ranker 565 may consider other data 920 in determining scores. The other data 920 may include rankings associated with the queried skills 590. A ranking may be a system ranking or a user-specific ranking. A ranking may indicate a veracity of a skill from the perspective of one or more users of the system. For example, the post-NLU ranker 565 may generate a first score for a first skill 590*a* that is greater than the first skill's NLU processing confidence score based on the first skill 590*a* being associated with a high ranking. For further example, the post-NLU ranker 565 may generate a second score for a second skill 590*b* that is less than the second skill's NLU processing confidence score based on the second skill 590*b* being associated with a low ranking.

The other data 920 may include information indicating whether or not the user that originated the user input has enabled one or more of the queried skills 590. For example, the post-NLU ranker 565 may generate a first score for a first skill 590*a* that is greater than the first skill's NLU processing confidence score based on the first skill 590*a* being enabled by the user that originated the user input. For further example, the post-NLU ranker 565 may generate a second score for a second skill 590*b* that is less than the second skill's NLU processing confidence score based on the second skill 590*b* not being enabled by the user that originated the user input. When the post-NLU ranker 565 receives the NLU results data 985, the post-NLU ranker 565 may determine whether profile data, associated with the user and/or device that originated the user input, includes indications of enabled skills.

The other data 920 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 565 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 565 may increase the NLU processing confidence score associated with a first skill configured to output visual data and/or decrease the NLU processing confidence score associated with a second skill configured to output audio data.

The other data 920 may include information indicating the veracity of the result data 930 provided by a skill 590. For example, if a user says "tell me a recipe for pasta sauce," a first skill 590*a* may provide the post-NLU ranker 565 with first result data 930*a* corresponding to a first recipe associated with a five star rating and a second skill 590*b* may provide the post-NLU ranker 565 with second result data 930*b* corresponding to a second recipe associated with a one star rating. In this situation, the post-NLU ranker 565 may increase the NLU processing confidence score associated with the first skill 590*a* based on the first skill 590*a* providing the first result data 930*a* associated with the five star rating and/or decrease the NLU processing confidence score associated with the second skill 590*b* based on the second skill 590*b* providing the second result data 930*b* associated with the one star rating.

The other data 920 may include information indicating the type of device that originated the user input. For example, the device may correspond to a "hotel room" type if the device is located in a hotel room. If a user inputs a command corresponding to "order me food" to the device located in the hotel room, the post-NLU ranker 565 may increase the NLU processing confidence score associated with a first skill 590*a* corresponding to a room service skill associated with the hotel and/or decrease the NLU processing confidence score associated with a second skill 590*b* corresponding to a food skill not associated with the hotel.

The other data 920 may include information indicating a location of the device and/or user that originated the user input. The system may be configured with skills 590 that may only operate with respect to certain geographic locations. For example, a user may provide a user input corresponding to "when is the next train to Portland." A first skill 590*a* may operate with respect to trains that arrive at, depart from, and pass through Portland, Oregon. A second skill 590*b* may operate with respect to trains that arrive at, depart from, and pass through Portland, Maine. If the device and/or user that originated the user input is located in Seattle, Washington, the post-NLU ranker 565 may increase the NLU processing confidence score associated with the first skill 590*a* and/or decrease the NLU processing confidence score associated with the second skill 590*b*. Likewise, if the device and/or user that originated the user input is located in Boston, Massachusetts, the post-NLU ranker 565 may increase the NLU processing confidence score associated with the second skill 590*b* and/or decrease the NLU processing confidence score associated with the first skill 590*a*.

The other data 920 may include information indicating a time of day. The system may be configured with skills 590 that operate with respect to certain times of day. For example, a user may provide a user input corresponding to "order me food." A first skill 590*a* may generate first result data 930*a* corresponding to breakfast. A second skill 590*b* may generate second result data 930*b* corresponding to dinner. If the system component(s) 120 receives the user input in the morning, the post-NLU ranker 565 may increase the NLU processing confidence score associated with the first skill 590*a* and/or decrease the NLU processing score associated with the second skill 590*b*. If the system component(s) 120 receives the user input in the afternoon or evening, the post-NLU ranker 565 may increase the NLU processing confidence score associated with the second skill 590*b* and/or decrease the NLU processing confidence score associated with the first skill 590*a*.

The other data 920 may include information indicating user preferences. The system may include multiple skills 590 configured to execute in substantially the same manner. For example, a first skill 590*a* and a second skill 590*b* may both be configured to order food from respective restaurants. The system may store a user preference (e.g., in the profile storage 570) that is associated with the user that provided the user input to the system component(s) 120 as well as indicates the user prefers the first skill 590*a* over the second skill 590*b*. Thus, when the user provides a user input that may be executed by both the first skill 590*a* and the second skill 590*b*, the post-NLU ranker 565 may increase the NLU processing confidence score associated with the first skill 590*a* and/or decrease the NLU processing confidence score associated with the second skill 590*b*.

The other data 920 may include information indicating system usage history associated with the user that originated the user input. For example, the system usage history may indicate the user originates user inputs that invoke a first skill 590*a* more often than the user originates user inputs that invoke a second skill 590*b*. Based on this, if the present user input may be executed by both the first skill 590*a* and the second skill 590*b*, the post-NLU ranker 565 may increase the NLU processing confidence score associated with the first skill 590*a* and/or decrease the NLU processing confidence score associated with the second skill 590*b*.

The other data 920 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 565 may increase the NLU processing confidence score associated with a first skill 590*a* that generates audio data. The post-NLU ranker 565 may also or alternatively decrease the NLU processing confidence score associated with a second skill 590*b* that generates image data or video data.

The other data 920 may include information indicating how long it took a skill 590 to provide result data 930 to the post-NLU ranker 565. When the post-NLU ranker 565 multiple skills 590 for result data 930, the skills 590 may respond to the queries at different speeds. The post-NLU ranker 565 may implement a latency budget. For example, if the post-NLU ranker 565 determines a skill 590 responds to the post-NLU ranker 565 within a threshold amount of time from receiving a query from the post-NLU ranker 565, the post-NLU ranker 565 may increase the NLU processing confidence score associated with the skill 590. Conversely, if the post-NLU ranker 565 determines a skill 590 does not respond to the post-NLU ranker 565 within a threshold amount of time from receiving a query from the post-NLU ranker 565, the post-NLU ranker 565 may decrease the NLU processing confidence score associated with the skill 590.

It has been described that the post-NLU ranker 565 uses the other data 920 to increase and decrease NLU processing confidence scores associated with various skills 590 that the post-NLU ranker 565 has already requested result data from. Alternatively, the post-NLU ranker 565 may use the other data 920 to determine which skills 590 to request result data from. For example, the post-NLU ranker 565 may use the other data 920 to increase and/or decrease NLU processing confidence scores associated with skills 590 associated with the NLU results data 985 output by the NLU component 560. The post-NLU ranker 565 may select n-number of top scoring altered NLU processing confidence scores. The post-NLU ranker 565 may then request result data 930 from only the skills 590 associated with the selected n-number of NLU processing confidence scores.

As described, the post-NLU ranker 565 may request result data 930 from all skills 590 associated with the NLU results data 985 output by the NLU component 560. Alternatively, the system component(s) 120 may prefer result data 930 from skills implemented entirely by the system component (s) 120 rather than skills at least partially implemented by the skill system component(s) 525. Therefore, in the first instance, the post-NLU ranker 565 may request result data 930 from only skills associated with the NLU results data 985 and entirely implemented by the system component(s) 120. The post-NLU ranker 565 may only request result data 930 from skills associated with the NLU results data 985, and at least partially implemented by the skill system component(s) 525, if none of the skills, wholly implemented by the system component(s) 120, provide the post-NLU ranker 565 with result data 930 indicating either data response to the NLU results data 985, an indication that the skill can execute the user input, or an indication that further information is needed.

As indicated above, the post-NLU ranker 565 may request result data 930 from multiple skills 590. If one of the skills 590 provides result data 930 indicating a response to a NLU hypothesis and the other skills provide result data 930 indicating either they cannot execute or they need further information, the post-NLU ranker 565 may select the result data 930 including the response to the NLU hypothesis as the data to be output to the user. If more than one of the skills 590 provides result data 930 indicating responses to NLU hypotheses, the post-NLU ranker 565 may consider the other data 920 to generate altered NLU processing confidence scores, and select the result data 930 of the skill associated with the greatest score as the data to be output to the user.

A system that does not implement the post-NLU ranker 565 may select the highest scored NLU hypothesis in the NLU results data 985. The system may send the NLU hypothesis to a skill 590 associated therewith along with a request for output data. In some situations, the skill 590 may not be able to provide the system with output data. This results in the system indicating to the user that the user input could not be processed even though another skill associated with lower ranked NLU hypothesis could have provided output data responsive to the user input.

The post-NLU ranker 565 reduces instances of the aforementioned situation. As described, the post-NLU ranker 565 queries multiple skills associated with the NLU results data 985 to provide result data 930 to the post-NLU ranker 565 prior to the post-NLU ranker 565 ultimately determining the skill 590 to be invoked to respond to the user input. Some of the skills 590 may provide result data 930 indicating responses to NLU hypotheses while other skills 590 may providing result data 930 indicating the skills cannot provide responsive data. Whereas a system not implementing the post-NLU ranker 565 may select one of the skills 590 that could not provide a response, the post-NLU ranker 565 only selects a skill 590 that provides the post-NLU ranker 565 with result data corresponding to a response, indicating further information is needed, or indicating multiple responses can be generated.

The post-NLU ranker 565 may select result data 930, associated with the skill 590 associated with the highest score, for output to the user. Alternatively, the post-NLU ranker 565 may output ranked output data 925 indicating skills 590 and their respective post-NLU ranker rankings. Since the post-NLU ranker 565 receives result data 930, potentially corresponding to a response to the user input, from the skills 590 prior to post-NLU ranker 565 selecting one of the skills or outputting the ranked output data 925, little to no latency occurs from the time skills provide result data 930 and the time the system outputs responds to the user.

If the post-NLU ranker 565 selects result audio data to be output to a user and the system determines content should be output audibly, the post-NLU ranker 565 (or another component of the system component(s) 120) may cause the device 110a and/or the device 110b to output audio corresponding to the result audio data. If the post-NLU ranker 565 selects result text data to output to a user and the system determines content should be output visually, the post-NLU ranker 565 (or another component of the system component(s) 120) may cause the device 110b to display text corresponding to the result text data. If the post-NLU ranker 565 selects result audio data to output to a user and the system determines content should be output visually, the post-NLU ranker 565 (or another component of the system component(s) 120) may send the result audio data to the ASR component 550. The ASR component 550 may generate output text data corresponding to the result audio data. The system component(s) 120 may then cause the device 110b to display text corresponding to the output text data. If the post-NLU ranker 565 selects result text data to output to a user and the system determines content should be output audibly, the post-NLU ranker 565 (or another component of the system component(s) 120) may send the result text data to the TTS component 580. The TTS component 580 may generate output audio data (corresponding to computer-generated speech) based on the result text data. The system component(s) 120 may then cause the device 110a and/or the device 110b to output audio corresponding to the output audio data.

As described, a skill 590 may provide result data 930 either indicating a response to the user input, indicating more information is needed for the skill 590 to provide a response to the user input, or indicating the skill 590 cannot provide a response to the user input. If the skill 590 associated with the highest post-NLU ranker score provides the post-NLU ranker 565 with result data 930 indicating a response to the user input, the post-NLU ranker 565 (or another component of the system component(s) 120, such as the orchestrator component 530) may simply cause content corresponding to the result data 930 to be output to the user. For example, the post-NLU ranker 565 may send the result data 930 to the orchestrator component 530. The orchestrator component 530 may cause the result data 930 to be sent to the device (110a/110b), which may output audio and/or display text corresponding to the result data 930. The orchestrator component 530 may send the result data 930 to the ASR component 550 to generate output text data and/or may send the result data 930 to the TTS component 580 to generate output audio data, depending on the situation.

The skill 590 associated with the highest post-NLU ranker score may provide the post-NLU ranker 565 with result data 930 indicating more information is needed as well as instruction data. The instruction data may indicate how the skill 590 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110a/110b). When this occurs, the post-NLU ranker 565 may simply cause the received instruction data be output by the device (110a/110b). Alternatively, the instruction data may be in a format that is not capable of being output by the device (110a/110b). When this occurs, the post-NLU ranker 565 may cause the ASR component 550 or the TTS component 580 to process the instruction data, depending on the situation, to generate instruction data that may be output by the device (110a/110b). Once the user provides the system with all further information needed by the skill 590, the skill 590 may provide the system with result data 930 indicating a response to the user input, which may be output by the system as detailed above.

The system may include "informational" skills 590 that simply provide the system with information, which the system outputs to the user. The system may also include "transactional" skills 590 that require a system instruction to execute the user input. Transactional skills 590 include ride sharing skills, flight booking skills, etc. A transactional skill 590 may simply provide the post-NLU ranker 565 with result data 930 indicating the transactional skill 590 can execute the user input. The post-NLU ranker 565 may then cause the system to solicit the user for an indication that the system is permitted to cause the transactional skill 590 to execute the user input. The user-provided indication may be an audible indication or a tactile indication (e.g., activation of a virtual button or input of text via a virtual keyboard). In response to receiving the user-provided indication, the system may provide the transactional skill 590 with data corresponding to the indication. In response, the transactional skill 590 may execute the command (e.g., book a flight, book a train ticket, etc.). Thus, while the system may not further engage an informational skill 590 after the informational skill 590 provides the post-NLU ranker 565 with result data 930, the system may further engage a transactional skill 590 after the transactional skill 590 provides the post-NLU ranker 565 with result data 930 indicating the transactional skill 590 may execute the user input.

In some instances, the post-NLU ranker 565 may generate respective scores for first and second skills that are too close (e.g., are not different by at least a threshold difference) for the post-NLU ranker 565 to make a confident determination regarding which skill should execute the user input. When this occurs, the system may request the user indicate which skill the user prefers to execute the user input. The system may output TTS-generated speech to the user to solicit which skill the user wants to execute the user input.

Figure 10:
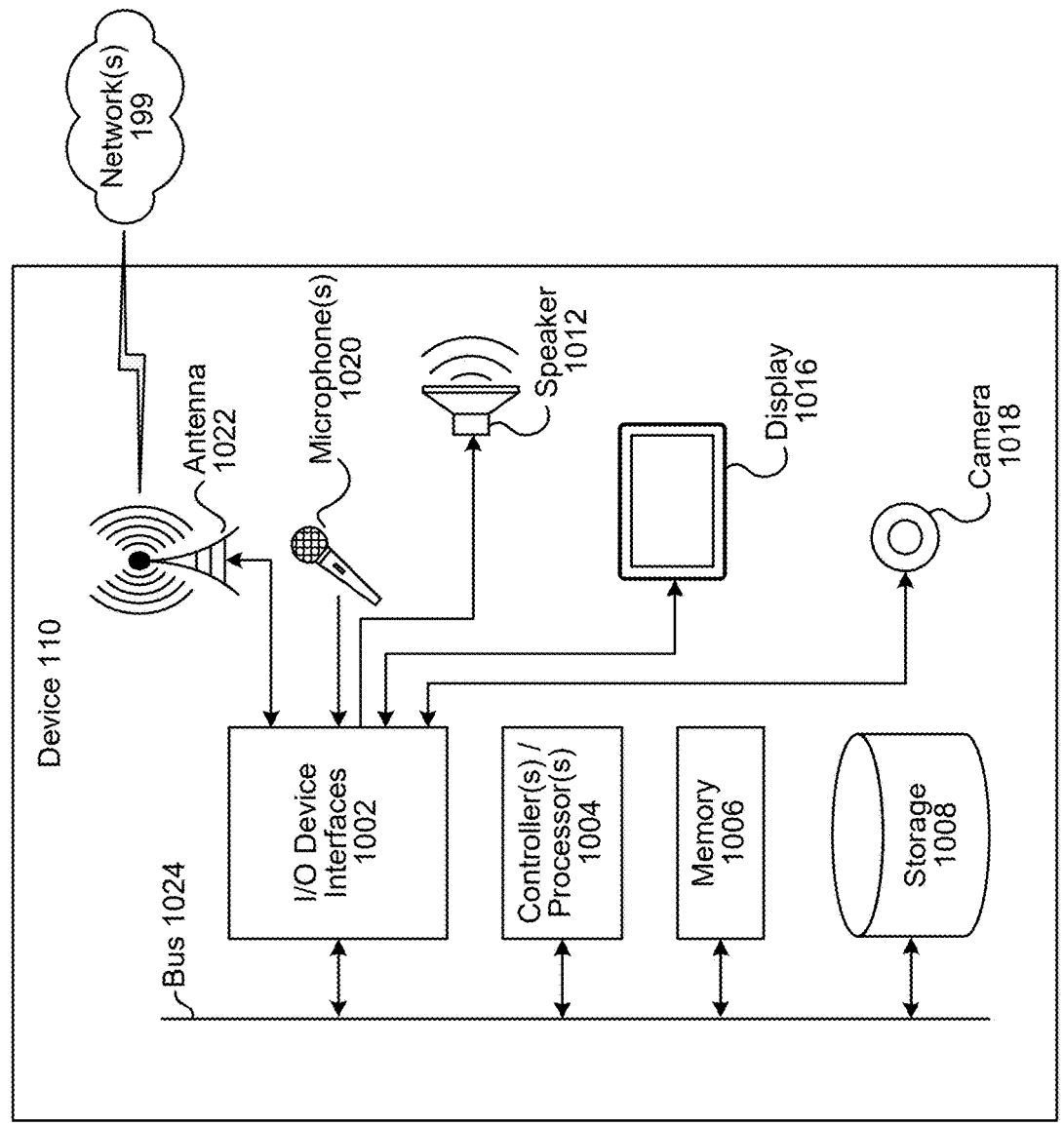
FIG. 10 is a block diagram conceptually illustrating example components of a device, according to embodiments of the present disclosure.
Figure 11:
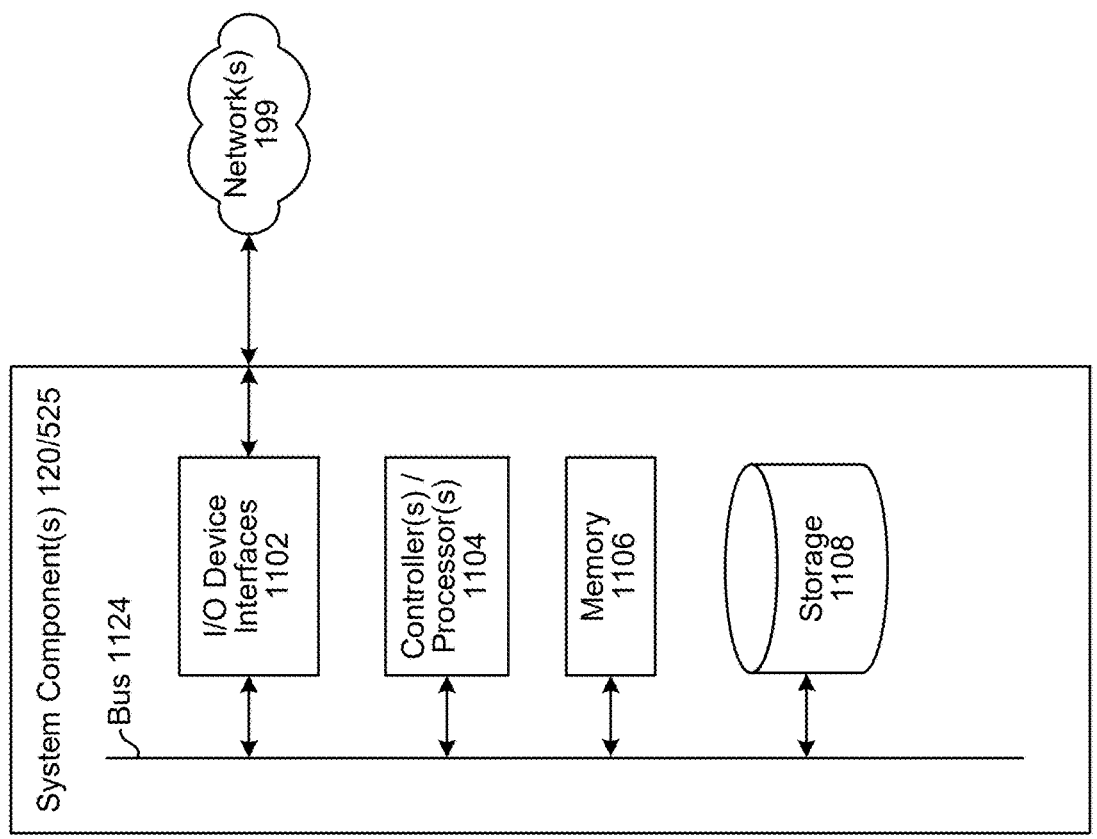
FIG. 11 is a block diagram conceptually illustrating example components of a system, according to embodiments of the present disclosure.

FIG. 10 is a block diagram conceptually illustrating a device 110 that may be used with the system. FIG. 11 is a block diagram conceptually illustrating example components of a system component(s) 120, such as the natural language command processing system component(s), which may assist with ASR processing, NLU processing, etc., and a skill system component(s) 525. A system (120/525) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system component(s) may be located remotely from the device 110 as its operations may not require proximity to the user. The server/system component(s) may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). The supporting device 120 may also be a version of a user device 110 that includes different (e.g., more) processing capabilities than other user device(s) 110 in a home/office. One benefit to the server/system component(s) being in a user's home/business is that data used to process a command/return a response may be kept within the user's home, thus reducing potential privacy concerns.

Multiple system components (120/525) may be included in the overall system 100 of the present disclosure, such as one or more natural language processing system component(s) 120 for performing ASR processing, one or more natural language processing system component(s) 120 for performing NLU processing, one or more skill system component(s) 525, etc. In operation, each of these systems may include computer-readable and computer-executable instructions that reside on the respective device (120/525), as will be discussed further below.

Each of these devices (110/120/525) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120/525) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/525) may also be connected to removable or external non-volatile memory and/or storage (such as a removable memory card, memory key drive, networked storage, etc.) through respective input/output device interfaces (1002/1102).

Computer instructions for operating each device (110/120/525) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120/525) includes input/output device interfaces (1002/1102). A variety of components may be connected through the input/output device interfaces (1002/1102), as will be discussed further below. Additionally, each device (110/120/525) may include an address/data bus (1024/1124) for conveying data among components of the respective device. Each component within a device (110/120/525) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 1020 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1016 for displaying content. The device 110 may further include a camera 1018.

Via antenna(s) 1022, the input/output device interfaces 1002 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device(s) 110, the natural language command processing system component(s), or a skill system component(s) 525 may include their own dedicated processors, memory, and/or storage. Alternatively, one or more of the components of the device(s) 110, the natural language command processing system component(s), or a skill system component(s) 525 may utilize the I/O interfaces (1002/1102), processor(s) (1004/1104), memory (1006/1106), and/or storage (1008/1108) of the device(s) 110, natural language command processing system component(s), or the skill system component(s) 525, respectively. Thus, the ASR component 550 may have its own I/O interface(s), processor(s), memory, and/or storage; the NLU component 560 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system component(s), and a skill system component(s) 525, as described herein, are illustrative, and may be located as a stand-alone device or may be included, in whole or in part, as a component of a larger device or system. As can be appreciated, a number of components may exist either on a system component(s) and/or on device 110.

For example, language processing 192 (which may include ASR 550), language output 593 (which may include NLG 579 and TTS 580), etc., for example as illustrated in FIG. 5. Unless expressly noted otherwise, the system version of such components may operate similarly to the device version of such components and thus the description of one version (e.g., the system version or the local version) applies to the description of the other version (e.g., the local version or system version) and vice-versa.

Figure 12:
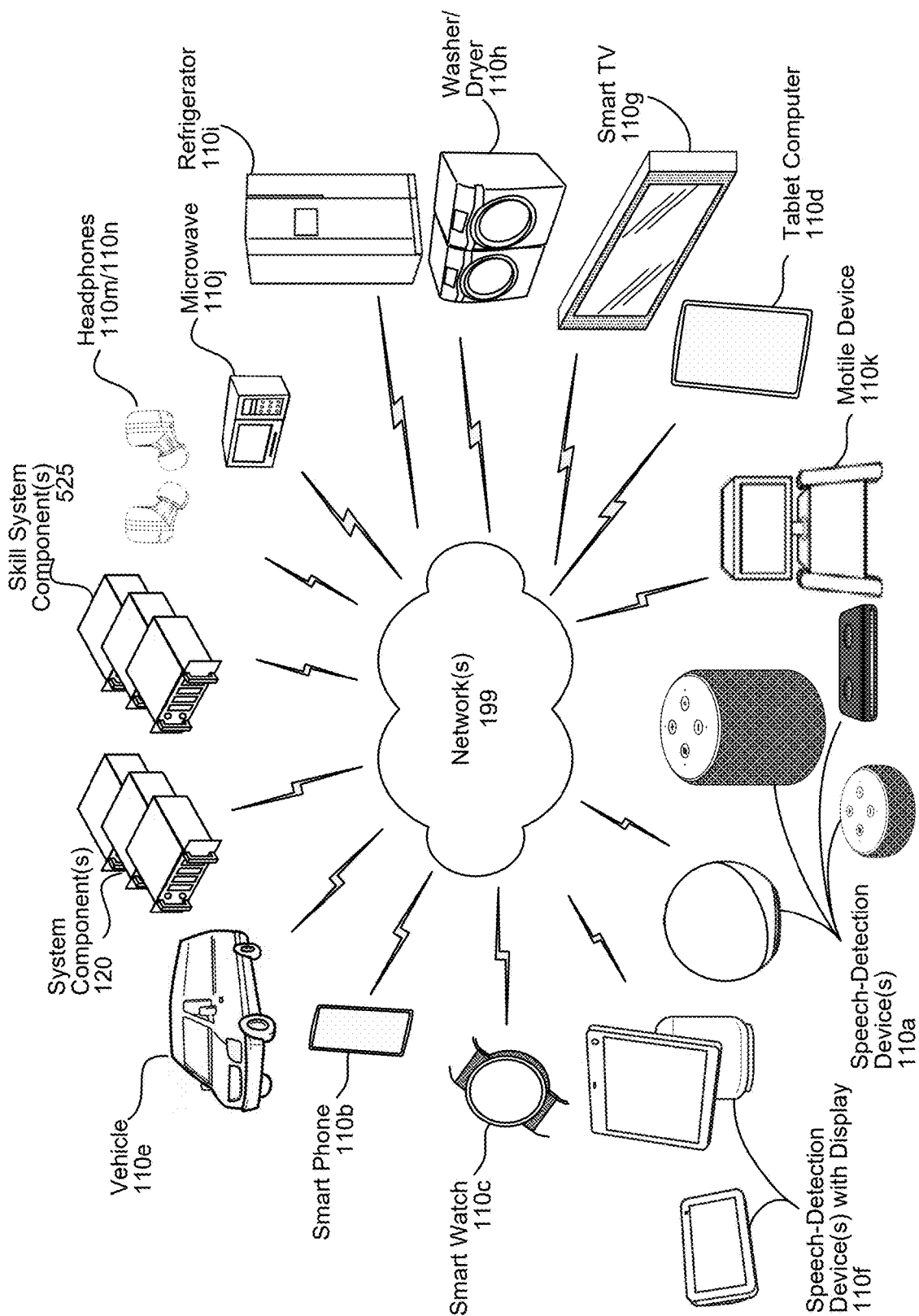
FIG. 12 illustrates an example of a computer network for use with the overall system, according to embodiments of the present disclosure.

As illustrated in FIG. 12, multiple devices (110a-110n, 120, 525) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile device 110k (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system component(s) 525, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 550, the NLU component 560, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among other", "c"n"" "cou"d"" "mig"t"" "m"y,"" e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
    receiving, from a first device, gradient data corresponding to operation, by the first device, of a first machine learning model configured to detect a representation of a wakeword;
    receiving, from a second device, first audio data corresponding to detection of the wakeword by the second device, wherein the detection resulted from operation of the first machine learning model by the second device;
    processing the first audio data using a second machine learning model configured to detect a representation of the wakeword;
    determining, as a result of processing the first audio data using the second machine learning model, that the detection of the wakeword was a false-positive;
    processing the first audio data and the gradient data to determine an updated first machine learning model; and
    sending the updated first machine learning model to the first device and the second device.

2. The computer-implemented method of claim 1, further comprising, by the first device:
    detecting first audio using at least one microphone;
    determining first input audio data representing the first audio;
    processing the first input audio data using the first machine learning model to determine first model output data indicating an absence of the wakeword in the first audio;

detecting second audio using the at least one microphone;
determining second input audio data representing the second audio;
processing the second input audio data using the first machine learning model to determine second model output data indicating detection of the wakeword in the second audio;
determining the second audio was detected within a time threshold of the first audio;
based at least in part on the second audio being detected within the time threshold of the first audio, determining the gradient data;
determining metadata corresponding to the gradient data; and
sending the metadata.

3. The computer-implemented method of claim 1, further comprising:
receiving, from the second device, first metadata corresponding to the first audio data;
performing automatic speech recognition (ASR) processing using the first audio data to determine ASR data;
performing natural language understanding (NLU) processing using the ASR data to determine NLU data; and
processing the first metadata, the ASR data, the NLU data, and the first audio data using a third machine learning model to determine label data corresponding to representation of the wakeword in the first audio data,
wherein determination of the updated first machine learning model further comprises processing the label data.

4. The computer-implemented method of claim 1, further comprising:
receiving, from a third device, second gradient data;
determining the gradient data is associated with a first user characteristic;
determining the first audio data is associated with the first user characteristic; and
determining the second gradient data is associated with a second user characteristic different from the first user characteristic,
wherein determination of the updated first machine learning model is performed without involving the second gradient data in response to the second gradient data being associated with the second user characteristic.

5. A computer-implemented method, comprising:
receiving first parameter data corresponding to adjustment of at least one parameter of a first machine learning model by a first device as a result of processing audio data, by the first device, using the first machine learning model;
receiving, from a second device, first audio data corresponding to operation of the first machine learning model by the second device;
processing the first audio data using a second machine learning model to determine the first audio data corresponds to incorrect processing by the second device using the first machine learning model; and
processing the first audio data and the first parameter data to determine an updated first machine learning model.

6. The computer-implemented method of claim 5, further comprising:
processing the first audio data using a third machine learning model to determine label data corresponding to the first audio data,
wherein determination of the updated first machine learning model further comprises processing the label data.

7. The computer-implemented method of claim 6, further comprising:
performing automatic speech recognition (ASR) processing using the first audio data to determine ASR data; and
performing natural language understanding (NLU) processing using the ASR data to determine NLU data,
wherein determination of the label data further comprises processing the ASR data and the NLU data.

8. The computer-implemented method of claim 5, further comprising:
receiving first metadata corresponding to the first parameter data; and
receiving second metadata corresponding to the first audio data,
wherein determination of the updated first machine learning model further comprises processing the first metadata and the second metadata.

9. The computer-implemented method of claim 8, wherein the second metadata comprises an indicator of a wakeword detected by the second device.

10. The computer-implemented method of claim 5, further comprising:
receiving second parameter data corresponding to adjustment of at least one parameter of the first machine learning model by a third device as a result of processing audio data, by the third device, using the first machine learning model;
storing the first parameter data and the second parameter data; and
determining stored parameter data satisfies a condition corresponding to an amount of the stored parameter data,
wherein determination of the updated first machine learning model is performed in response to the stored parameter data satisfying the condition, and
wherein determination of the updated first machine learning model further comprises processing the second parameter data.

11. The computer-implemented method of claim 5, further comprising:
receiving, from a third device, second parameter data;
determining the first parameter data is associated with a first characteristic;
determining the first audio data is associated with the first characteristic; and
determining the second parameter data is associated with a second characteristic different from the first characteristic,
wherein determination of the updated first machine learning model is performed without involving the second parameter data in response to the second parameter data being associated with the second characteristic.

12. The computer-implemented method of claim 5, further comprising:
determining the updated first machine learning model satisfies a difference condition with respect to the first machine learning model; and
in response to satisfaction of the difference condition, sending, to the first device and the second device, first data corresponding to the updated first machine learning model.

13. A system comprising:
at least one processor; and
at least one memory comprising instructions that, when executed by the at least one processor, cause the system to:
receive first parameter data corresponding to adjustment of at least one parameter of a first machine learning model by a first device as a result of processing audio data, by the first device, using the first machine learning model;

receive, from a second device, first audio data corresponding to operation of the first machine learning model by the second device;

process the first audio data using a second machine learning model to determine the first audio data corresponds to incorrect processing by the second device using the first machine learning model; and process the first audio data and the first parameter data to determine an updated first machine learning model.

14. The system of claim 13, wherein the at least one memory further comprises instructions that, when executed by the at least one processor, further cause the system to:
process the first audio data using a third machine learning model to determine label data corresponding to the first audio data,
wherein determination of the updated first machine learning model further comprises processing the label data.

15. The system of claim 14, wherein the at least one memory further comprises instructions that, when executed by the at least one processor, further cause the system to:
perform automatic speech recognition (ASR) processing using the first audio data to determine ASR data; and
perform natural language understanding (NLU) processing using the ASR data to determine NLU data,
wherein determination of the label data further comprises processing the ASR data and the NLU data.

16. The system of claim 13, wherein the at least one memory further comprises instructions that, when executed by the at least one processor, further cause the system to:
receive first metadata corresponding to the first parameter data; and
receive second metadata corresponding to the first audio data,
wherein determination of the updated first machine learning model further comprises processing the first metadata and the second metadata.

17. The system of claim 16, wherein the second metadata comprises an indicator of a wakeword detected by the second device.

18. The system of claim 13, wherein the at least one memory further comprises instructions that, when executed by the at least one processor, further cause the system to:
receive second parameter data corresponding to adjustment of at least one parameter of the first machine learning model by a third device as a result of processing audio data, by the third device, using the first machine learning model;
store the first parameter data and the second parameter data; and
determine stored parameter data satisfies a condition corresponding to an amount of the stored parameter data,
wherein determination of the updated first machine learning model is performed in response to the stored parameter data satisfying the condition, and
wherein determination of the updated first machine learning model further comprises processing the second parameter data.

19. The system of claim 13, wherein the at least one memory further comprises instructions that, when executed by the at least one processor, further cause the system to:
receive, from a third device, second parameter data;
determine the first parameter data is associated with a first characteristic;
determine the first audio data is associated with the first characteristic; and
determine the second parameter data is associated with a second characteristic different from the first characteristic,
wherein determination of the updated first machine learning model is performed without involving the second parameter data in response to the second parameter data being associated with the second characteristic.

20. The system of claim 13, wherein the at least one memory further comprises instructions that, when executed by the at least one processor, further cause the system to:
determine the updated first machine learning model satisfies a difference condition with respect to the first machine learning model; and
in response to satisfaction of the difference condition, send, to the first device and the second device, first data corresponding to the updated first machine learning model.

* * * * *